(12) United States Patent
Natsume

(10) Patent No.: US 7,602,433 B2
(45) Date of Patent: Oct. 13, 2009

(54) DRIVE CONTROLLING APPARATUS OF OPTICAL APPARATUS AND OPTICAL APPARATUS

(75) Inventor: Satoshi Natsume, Kanagawa (JP)

(73) Assignee: Canon Kabushiki Kaisha (JP)

( * ) Notice: Subject to any disclaimer, the term of this patent is extended or adjusted under 35 U.S.C. 154(b) by 649 days.

(21) Appl. No.: 10/808,651

(22) Filed: Mar. 25, 2004

(65) Prior Publication Data

US 2004/0190887 A1 Sep. 30, 2004

(30) Foreign Application Priority Data

Mar. 27, 2003 (JP) .............................. 2003-088039

(51) Int. Cl.
*H04N 5/225* (2006.01)
(52) U.S. Cl. ..................................... 348/335
(58) Field of Classification Search ................... 396/86, 396/76, 64, 419, 49; 348/358, 335, 240.3, 348/362, 345, 347, 357
See application file for complete search history.

(56) References Cited

U.S. PATENT DOCUMENTS

| | | | | |
|---|---|---|---|---|
| 4,735,494 A | * | 4/1988 | Makino et al. ............... 359/694 |
| 5,436,684 A | * | 7/1995 | Hirasawa ..................... 348/347 |
| 5,471,296 A | * | 11/1995 | Parker et al. ............ 356/139.06 |
| 5,883,666 A | * | 3/1999 | Kyuma et al. ............. 348/229.1 |
| 5,893,651 A | * | 4/1999 | Sakamoto ..................... 396/86 |
| 5,929,904 A | * | 7/1999 | Uchida ..................... 348/211.7 |
| 6,035,137 A | * | 3/2000 | Kaneko et al. ................. 396/76 |
| 6,070,016 A | * | 5/2000 | Kaneda ........................ 396/64 |
| 6,633,729 B1 | * | 10/2003 | Yoshikawa et al. ............ 396/76 |
| 6,822,686 B1 | * | 11/2004 | Kubo et al. .................. 348/347 |
| 6,967,686 B1 | * | 11/2005 | Tanaka ........................ 348/352 |
| 6,989,865 B1 | * | 1/2006 | Ohta ........................... 348/347 |
| 7,079,182 B1 | * | 7/2006 | Yoshikawa et al. ......... 348/240.3 |
| 7,158,179 B2 | * | 1/2007 | Yoshikawa et al. ........... 348/335 |
| 2001/0040638 A1 | * | 11/2001 | Yoshikawa et al. .......... 348/358 |

FOREIGN PATENT DOCUMENTS

| | | |
|---|---|---|
| JP | 10-078609 | 3/1998 |
| JP | 2000-305000 | 11/2000 |
| JP | 2001-124979 | 5/2001 |
| JP | 2001-125162 | 5/2001 |

* cited by examiner

*Primary Examiner*—Tuan Ho
*Assistant Examiner*—Kent Wang
(74) *Attorney, Agent, or Firm*—Rossi, Kimms & McDowell, LLP

(57) ABSTRACT

The drive controlling apparatus has a memory of storing preset drive information of each of the optical adjusting members, and a controller for performing a preset drive control for controlling the drive of each of the optical adjusting members on the basis of the preset drive information. The controller performs the preset drive control so as to include the state in which the plurality of optical adjusting members are simultaneously driven. Furthermore, the drive controlling apparatus has a selection member being operated for selecting a set condition of the drive speed of the plurality of optical adjusting members out of a plurality of set conditions. The controller sets the drive speed in the preset drive control in accordance with the set conditions selected with the selection member.

8 Claims, 21 Drawing Sheets

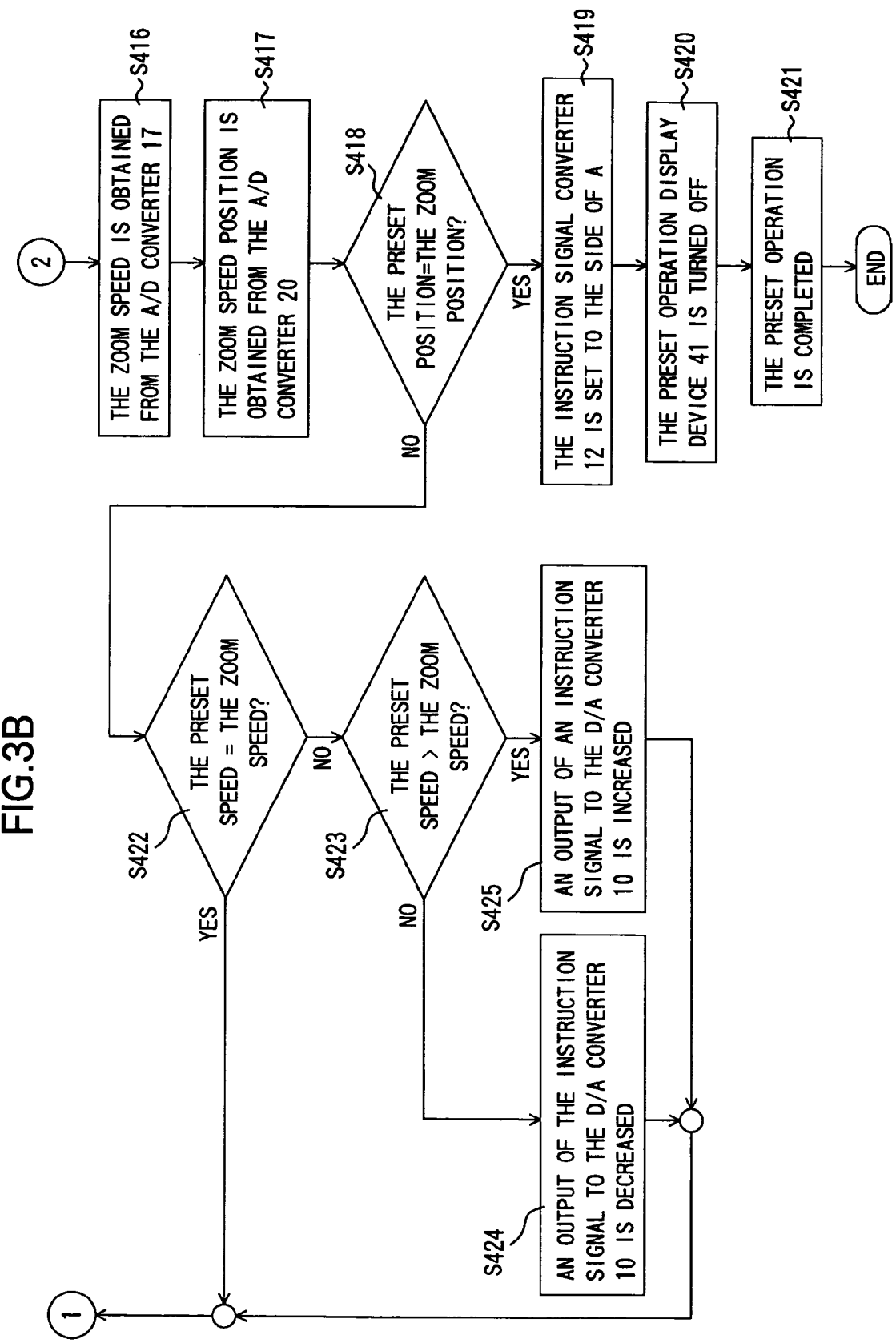

DRIVE CONTROLLING APPARATUS OF OPTICAL APPARATUS AND OPTICAL APPARATUS

BACKGROUND OF THE INVENTION

1. Field of the Invention

The present invention relates to a drive controlling apparatus of an optical apparatus which is used in a television camera, a video camera system and the like.

2. Description of the Related Art

As one function at the time of making images by the use of a television camera and a video camera, there is available a preset function. This function is such that an arbitrary number of zoom positions and zoom speeds are stored in advance as a preset position and a preset speed, so that the zoom lens unit is moved to the zoom position by turning on and off the preset switch during making images. The method of movement and control of these functions is disclosed in Japanese Patent Application Laid-Open No. 2001-124979 (corresponding to U.S. Pat. No. 6,633,729) or the like.

FIG. 17 is a view showing a structure of a lens apparatus. As a representative example of a preset function, there will be explained a memory position preset zoom control.

The "memory position preset zoom control" is to move the zoom lens at a speed set in advance toward the zoom position set in advance.

Specifically, an arbitrary zoom position is stored in memory as a preset position in advance while the drive speed of the arbitrary zoom lens is stored in memory as a preset speed in advance. Consequently, with the turn on of a predetermined switch, the zoom lens is moved to a preset position at a preset speed.

By the way, on the lens apparatus for an ENG camera, a motor which is referred to as a drive unit for electrically moving optical adjusting members such as a zoom, a focus, an iris or the like, and a lens driver incorporating a position detecting device and a control circuit are provided. FIG. 17 is a view showing a zoom drive and a control system in the state in which the drive and the system are taken out.

Hereinafter, there will be briefly explained a setting of a preset position, a preset zoom control operation at the time of using the function of the "memory position preset zoom control".

In FIG. 17, reference numeral 101 denotes a zoom control switch which is operated by the image-taker. Reference numeral 109 denotes a zoom lens unit for adjusting the magnification of the lens apparatus. Reference numeral 102 denotes an instruction signal generation circuit for generating an instruction signal for instructing a drive direction which stands proportional to an operation amount of the zoom lens control switch 101 and a drive speed (which may be a drive amount, or a drive position) for driving the zoom lens unit 109.

Reference numeral 103 denotes a zoom speed variable volume for varying a drive speed of the zoom lens unit 109 with respect to an operation amount of the zoom control switch 101. Reference numeral 104 denotes an instruction signal calculation circuit for performing a signal level conversion for taking in an instruction signal into an A/D converter 105. The A/D converter 105 converts an analog signal output from the instruction signal calculation circuit 104 into a digital signal.

Reference numeral 106 denotes a CPU for commanding a control of the drive unit (namely, the lens apparatus) and the CPU 106 also commands the preset drive control of the "memory position preset zoom control". In the CPU 106, there is provided a memory 106a which is capable of memorizing three kinds of preset information; the preset position which is used for these preset drive controls, the preset speed and the preset direction.

Reference numeral 107 denotes a memory position preset zoom (MPZ) switch which is provided for the "memory position preset zoom control" and has a position memory execution function for allowing the memory 106a to store preset position used for this control after the memory switch 108 is turned on or at the same time when the memory switch 108 is turned on. Furthermore, this memory position preset zoom lens (MPZ) switch 107 also has a function of instructing a start and a completion of the memory position preset zoom control with the turning-on thereof after memorizing the preset position.

Reference numeral 108 denotes a memory switch which is provided individually on the plurality of optical adjusting members, such as the zoom, the focus, the iris and the like, and which is shared for giving to the CPU 106 the memory instruction on the preset information such as the preset position and the preset speed.

Reference numeral 110 denotes a D/A converter for converting an instruction signal output from the CPU 106 for driving the zoom lens unit 109 from a digital signal into an analog signal. Reference numeral 111 denotes a CPU instruction signal calculation circuit for performing a signal level conversion of an instruction signal output from the D/A converter 110. Reference numeral 112 denotes an instruction signal shifter for shifting the drive of the zoom lens unit 109 as to whether the drive is performed from the zoom control switch 101 or from the CPU 106.

Reference numeral 113 denotes an electric power amplifier for operating a motor 114 for driving the zoom lens unit 109. Reference numeral 115 denotes a speed detector for outputting a speed signal in accordance with the drive speed of the zoom lens unit 109. Reference numeral 116 denotes a speed signal calculation circuit for performing a signal level conversion for taking in the speed signal into the A/D converter 117. The A/D converter 117 converts an analog signal output from the speed signal calculation circuit 116 into a digital signal.

Reference numeral 118 denotes a position signal detector for outputting a position signal in accordance with the position of the zoom lens unit 109. Reference numeral 119 denotes a position signal calculation circuit for performing a signal level conversion for taking in the position signal into the A/D converter 120. The A/D converter 120 converts the analog signal output from the position signal calculation circuit 119 into a digital signal.

The preset position is set by moving the zoom lens unit 109 to the position which the image-taker desires to preset to change the memory position zoom switch 107 from the off-state to the on-state while keeping the memory switch 108 in the on-state. The position of the zoom lens unit 109 at the time of turning on the memory position preset zoom switch 107 (the actual position detected through the position detector 118) is stored in the memory 106a as the preset position.

Furthermore, the preset speed is set by changing the memory switch 108 from the off-state to the on-state in the state in which the image-taker operates the zoom control switch 101 to drive the zoom lens unit 109 at a speed which the image-taker desires to preset. The drive speed of the zoom lens unit 109 at the time of changing the memory switch 108 from the off-state to the on-state (the actual drive speed of the zoom lens unit 109 detected through the speed detector 115) is stored in the memory 106a as the preset speed.

In this manner, the "memory position preset zoom control" is performed wherein the zoom lens unit 109 is driven at the preset speed to the preset position by the motor 114 with the turning on of the memory position preset zoom switch 107 after the preset position and the preset speed are stored in the memory 106a.

Furthermore, the Japanese Patent Application Laid-Open No. 2000-305000 discloses a structure in which a preset function such as the "memory position preset zoom control" is enabled by the connection of the personal computer to the lens apparatus. Furthermore, in this publication, there is disclosed a preset function of the focus lens, and the preset function which can simultaneously drive the zoom lens and the focus lens, let alone the zoom lens. Furthermore, when the plurality of preset controls are given as an object, these driving speeds are adjusted to the faster preset control object.

With respect to the image-taking system including such lens apparatus, it is desired that a plurality of functions are provided while the size and the weight of the apparatus are reduced. However, in a structure disclosed in the Japanese Patent Application Laid-Open No. 2001-124979 or the like, the preset function only with the zoom lens 109 can be realized. However, the preset function only with the iris and the focus lens, the preset function for simultaneously driving the zoom lens, the focus lens and the iris, and the drive speed control at that time cannot be realized.

Furthermore, like the structure as disclosed in the Japanese Patent Application Laid-Open No. 2000-305000, in a method for a connection of a personal computer and a connection of a large-scale control box, the mobility is low.

SUMMARY OF THE INVENTION

An object of the present invention is to provide a new drive controlling apparatus which is capable of performing a preset drive control including a simultaneous drive state of a plurality of an optical adjusting members and an optical apparatus.

According to one aspect of the present invention to attain the object, there is provided a drive controlling apparatus for controlling the drive of a plurality of optical adjusting members provided on the optical apparatus, the controlling apparatus having a memory for memorizing preset drive information of each of the optical adjusting members and a controller for performing a preset drive control for controlling the drive of each of the optical adjusting members on the basis of the preset drive information. The controller performs the preset drive control so as to include a state in which the plurality of optical adjusting members are simultaneously driven. Furthermore, the drive controlling apparatus has a selection member for selecting the set condition of the drive speed of the plurality of optical adjusting members out of a plurality of set conditions. The controller sets the drive speed in the preset drive control in the preset drive control of the plurality of optical adjusting members in accordance with the set condition selected with the selection member.

The characteristic of the drive controlling apparatus and the optical apparatus attached with the drive controlling apparatus according to the present invention will be made clear from the following explanation on the specific embodiments by referring to the drawings.

DETAILED DESCRIPTION OF THE PREFERRED EMBODIMENTS

Figure 1:
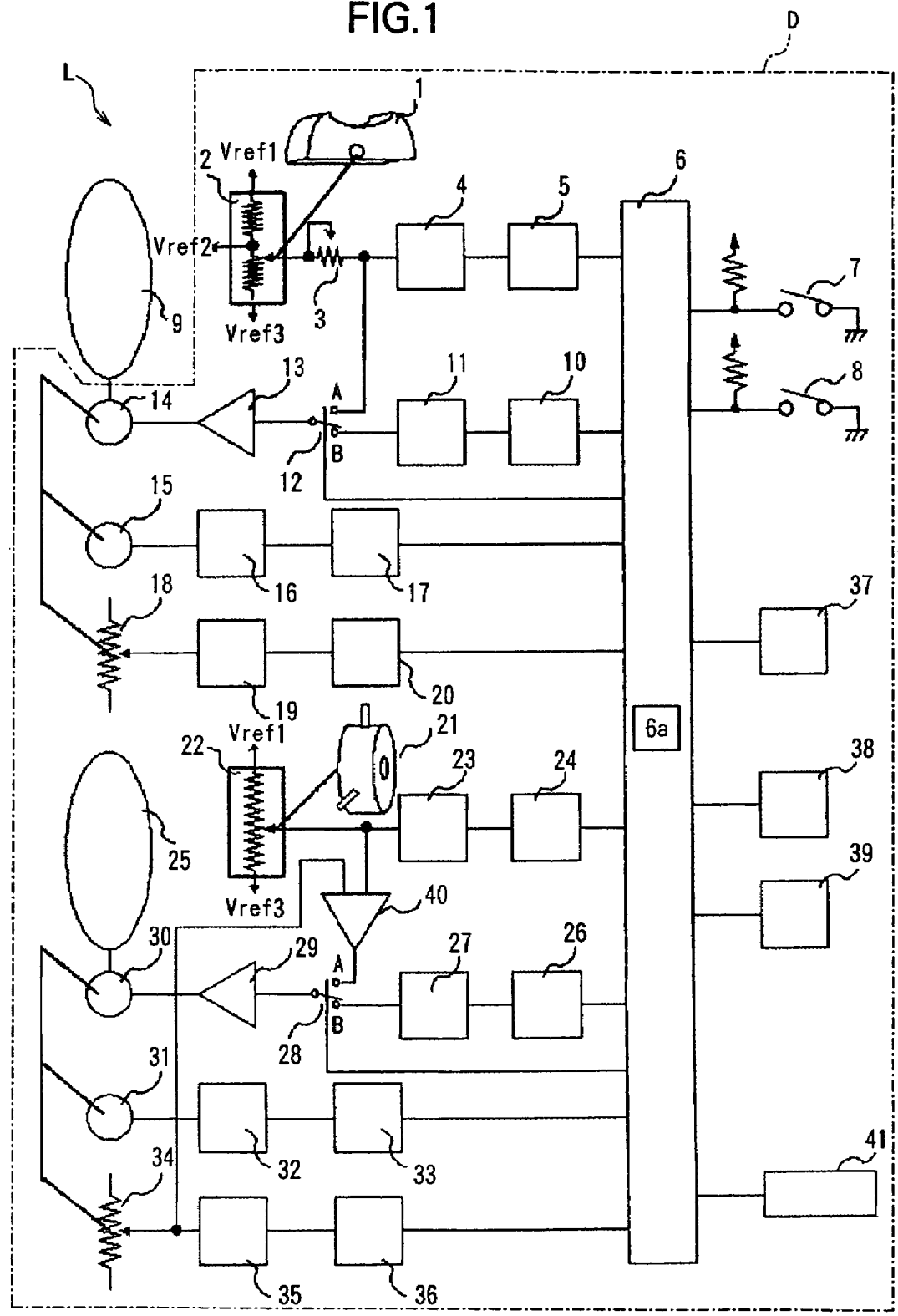
FIG. 1 is a block diagram showing a structure of a lens apparatus and a drive unit according to Embodiment 1 of the present invention.

Hereinafter, embodiments of the invention will be explained by referring to the drawings.

Embodiment 1

In Embodiment 1, there will be explained a case in which a zoom lens and a focus lens are set as an object of a preset control.

In the beginning, FIG. 1 is a view showing a structure of a lens apparatus L and a drive unit D which is attached on the lens apparatus L according to Embodiment 1.

In FIG. 1, reference numeral 1 denotes a zoom control switch operated by the image-taker. Reference numeral 9 denotes a zoom lens unit 9 as an optical adjusting member for performing variable power adjusting of the lens apparatus. Reference numeral 2 denotes an instruction signal generation circuit for generating an instruction signal for instructing a drive direction and a drive speed (a drive amount and a drive position will do) which stands proportional to the operation amount of the zoom control switch 1 for driving the zoom lens unit 9.

Reference numeral 3 denotes a zoom speed variable volume for varying the drive speed of the zoom lens unit 9 with respect to the operation amount of the zoom control switch 1. Reference numeral 4 denotes an instruction signal calculation circuit for performing a signal level conversion for taking in an instruction signal into an A/D converter 5. The A/D converter 5 converts the analog signal output from the instruction signal calculation circuit 4 into a digital signal.

Reference numeral 6 denotes a CPU as a controller for commanding a movement control of the drive unit D (namely, a lens apparatus L) and also commanding a preset drive control of the "memory position preset zoom control", the "memory position preset focus control" and the "memory position preset (zoom+focus) control". Inside of this CPU 6, a memory 6a is provided which is capable of memorizing the preset information such as the preset position, the preset speed and the like which is used in the plurality of preset drive control with respect to each zoom and focus.

Reference numeral 8 denotes a memory switch which is provided singly on the plurality of preset drive control, and which is shared for giving to the CPU 6 a memory instruction of the preset information such as the preset position, the preset speed and the like.

Reference numeral 7 denotes a memory position preset (MP) switch and the switch is singly provided with respect to the "memory position preset zoom control", and the "memory position preset focus control". This memory position preset (MP) switch 7 has a function of performing the position memory in which the preset position is stored in the memory 6a by the turning on of the memory preset switch 7, simultaneously together with the memory switch 8 or after turning on of the memory switch 8 with respect to the optical system (zoom or/and focus) of the preset control object selected with the preset object selection switch 38 which will be described later. Furthermore, the memory position preset (MP) switch also has a function of instructing a start and or completion of the "memory position preset zoom control" or the "memory position preset focus control" with the turning on of the memory switch after the memorization of the preset position.

Reference numeral 10 denotes a D/A converter for converting an instruction signal output for driving the zoom lens unit 9 from the CPU 6 from a digital signal to an analog signal. Reference numeral 11 denotes a CPU instruction signal calculation circuit for performing a signal level and shift conversion of the instruction signal output from the D/A converter 10. Reference numeral 12 denotes an instruction signal shifter for converting the drive of the zoom lens unit 9 as to whether the drive is performed either from the zoom control switch 1 or from the CPU 6. Reference numeral 13 denotes a power amplifier for driving the motor 14 which will be described later. Reference numeral 14 is a motor for driving the zoom lens unit 9. Reference numeral 15 denotes a speed detector for outputting a speed signal in accordance with the drive speed of the zoom lens unit 9. Reference numeral 16 denotes a speed signal calculation circuit for performing a signal level conversion for taking in the speed signal into the A/D converter 17. The A/D converter 17 converts the analog signal output from the speed signal calculation circuit 16 into a digital signal.

Reference numeral 18 denotes a position detector for outputting a position signal in accordance with the position of the zoom lens unit 9. Reference numeral 19 denotes a position signal calculation circuit for performing the signal level for taking in the position signal into the A/D converter 20. The A/D converter 20 converts the analog signal output from the position signal calculation circuit 19 into a digital signal.

Reference numeral 21 denotes a focus control switch operated by the image-taker. Reference numeral 22 denotes an instruction signal generation circuit for generating an instruction signal for instructing a drive amount and a drive position which stands proportional to the operation amount of the focus control switch 21 for electrically driving a focus lens unit (optical adjusting members) 25 which performs a focus adjusting of a lens apparatus. Reference numeral 23 denotes a CPU instruction signal calculation circuit for performing a signal shift conversion for taking in an instruction signal into an A/D converter 24. Reference numeral 25 denotes a focus lens unit for performing a focus adjusting of the lens apparatus.

Reference numeral 26 denotes a D/A converter for converting the instruction signal output for driving the focus lens unit 25 from the CPU 6 from a digital signal into an analog signal. Reference numeral 27 denotes a CPU instruction signal calculation circuit for performing a signal level conversion of the instruction signal output from the D/A converter 26. Reference numeral 28 denotes an instruction signal shifter for converting the drive of the focus lens unit 25 as to whether the drive is performed either from the focus control switch 21 or from the CPU 6. Reference numeral 29 denotes a power amplifier for driving the motor 30 which will be described later. Reference numeral 30 denotes a motor for driving a focus lens unit 25. Reference numeral 31 denotes a speed detector for outputting a speed signal in accordance with the drive speed of the focus lens unit 25. Reference numeral 32 denotes a speed signal calculation circuit for performing a signal shift conversion for taking in the speed signal into the A/D converter 33. The A/D converter 33 converts the analog signal output from the speed signal calculation circuit 32 into the digital signal.

Reference numeral 34 denotes a position detector for outputting a position signal in accordance with the position of the focus lens unit 25. Reference numeral 35 denotes a position signal calculation circuit for performing a signal level conversion for taking in the position signal into the A/D converter 36. The A/D converter 36 converts the analog signal output from the speed signal calculation circuit 35 into the digital signal.

Reference numeral 37 denotes a memory position preset focus (MPF) switch provided with respect to the "memory position preset focus control". This memory position preset focus (MPF) switch 37 has a position memory execution function of memorizing in the memory 6a the preset position used in the "memory position preset focus control" with the on operation after or at the same time with the operation of the memory switch 8. Furthermore, the memory position preset focus (MPF) switch 37 also has a function of instructing the start and the completion of the "memory position preset focus control" with the on operation after the preset position is set in the memory 6a.

Reference numeral 38 denotes a preset object selection switch for selecting as to whether the object of preset drive control is a zoom lens unit 9 or a focus lens unit 25, or both the zoom and the focus lens unit 9 and 25.

Reference numeral 39 denotes a preset speed selection switch which enables the selection as to which of respective preset speeds is allowed to coincide with the drive speed of which of the optical systems and which enables the selection of the preset speed at the time of performing the preset drive control of both optical systems 9 and 25. Reference numeral 40 denotes a differential amplifier for generating a focus control signal by amplifying a differential between the position of the instruction signal for driving the focus lens unit 25 from the instruction signal generation circuit 22 and the position of the position signal which agrees with the position of the focus lens unit 25 from the position signal detector 34. Reference numeral 41 denotes a preset movement display device for displaying an operation mode of the preset movement.

In the structure, there will be explained in the beginning a control at the time of driving the zoom lens unit 9 with the zoom control switch 1. In proportion to the operation amount of the zoom control switch 1, the instruction signal for instructing the drive direction and the drive speed (the drive amount and the drive position will do) output from the instruction signal generator 2 is input to the power amplifier 13 via zoom speed variable volume 3 and the side A of the instruction signal shifter 12. Consequently, the motor 14 is controlled, so that the zoom lens unit 9 is driven.

Next, there will be explained a control at the time of driving the focus lens unit 25 with the focus control switch 21. In accordance with the operation position of the focus control switch 21, the instruction signal showing the position (the drive direction and the drive speed will do) output from the instruction signal generator 22 is input to the differential amplifier 40. The differential amplifier 40 outputs an analog instruction signal in accordance with the differential between the instruction signal and the position signal showing the current position focus lens unit 25 from the position detector 34. The analog instruction signal is input to the power amplifier 29 via the side of A of the instruction signal shifter 28. Consequently, the motor 30 is controlled, so that the focus lens unit 25 is driven.

Next, there will be explained the preset zoom position memory processing, the preset zoom speed memory processing, the preset focus position memory processing and the preset focus speed memory processing at the time of using the preset function.

In the beginning, there will be explained the preset zoom position memory processing. The setting of the preset position is such that the zoom lens unit 9 is moved to a position which the image-taker desired to preset so that the MP switch 7 is turned on from the off state in the state in which the memory switch 8 is turned on. The position of the zoom lens unit 9 (hereinafter referred to as the zoom position) at this time is stored in the CPU 6 as the preset position.

Figure 9:
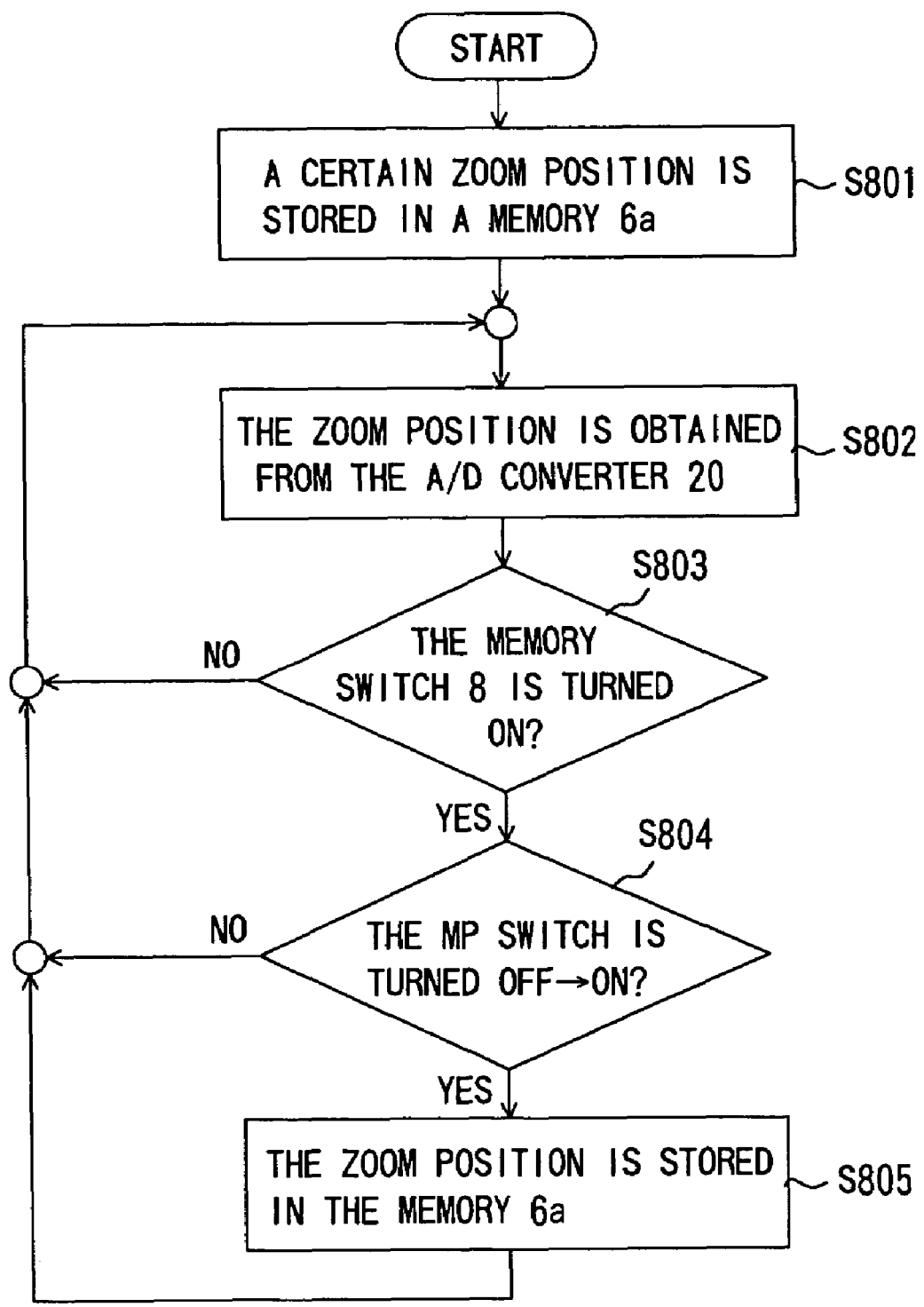
FIG. 9 is a flowchart showing a processing inside the CPU associated with the memory processing of the preset zoom position according to Embodiment 1.

The preset zoom position memory processing which is performed in the CPU 6 will be explained by using the flowchart of FIG. 9.

In the beginning, a predetermined zoom position such as the WIDE end or the like will be stored as a preset position in the memory 6a as the initial setting (step 801). Incidentally, step is denoted by S in the drawing. The same holds true of other drawings. The preset position at the time of this initial setting may be the zoom position at the time of the throwing in of the electric power of the lens apparatus, the zoom position which the image-taker desires, or the zoom position set in the midst of the previous time throwing in of the electric power of the lens apparatus.

Next, the zoom position is obtained from the A/D converter 20 (step 802). Thereafter, it is judged whether or not the memory switch 8 is turned on (step 803). In the case where the memory switch 8 is not turned on, the process returns again to step 802.

In the case where the memory switch 8 is turned on, it is judged whether or not the MP switch 7 has changed from the OFF state to the ON state (step 804). In the case where the MP switch 7 has not changed from the OFF state to the ON state, the process returns to step 802. In the case where the MP switch 7 has changed from the OFF state to the ON state, the zoom position obtained at step 802 is stored in the memory 6a as a new preset position (step 805).

Next, the preset zoom speed memory processing will be explained. The preset speed is set in such a manner that the image-taker operates the zoom control switch 1, so that the CPU 6 stores as a preset speed the drive speed (hereinafter referred to as the zoom speed) of the zoom lens unit 9 at the time of the turning on of the memory switch 8 from the OFF state in the state in which the zoom lens unit 9 is driven at the speed which is desired to be set in advance.

Figure 10:
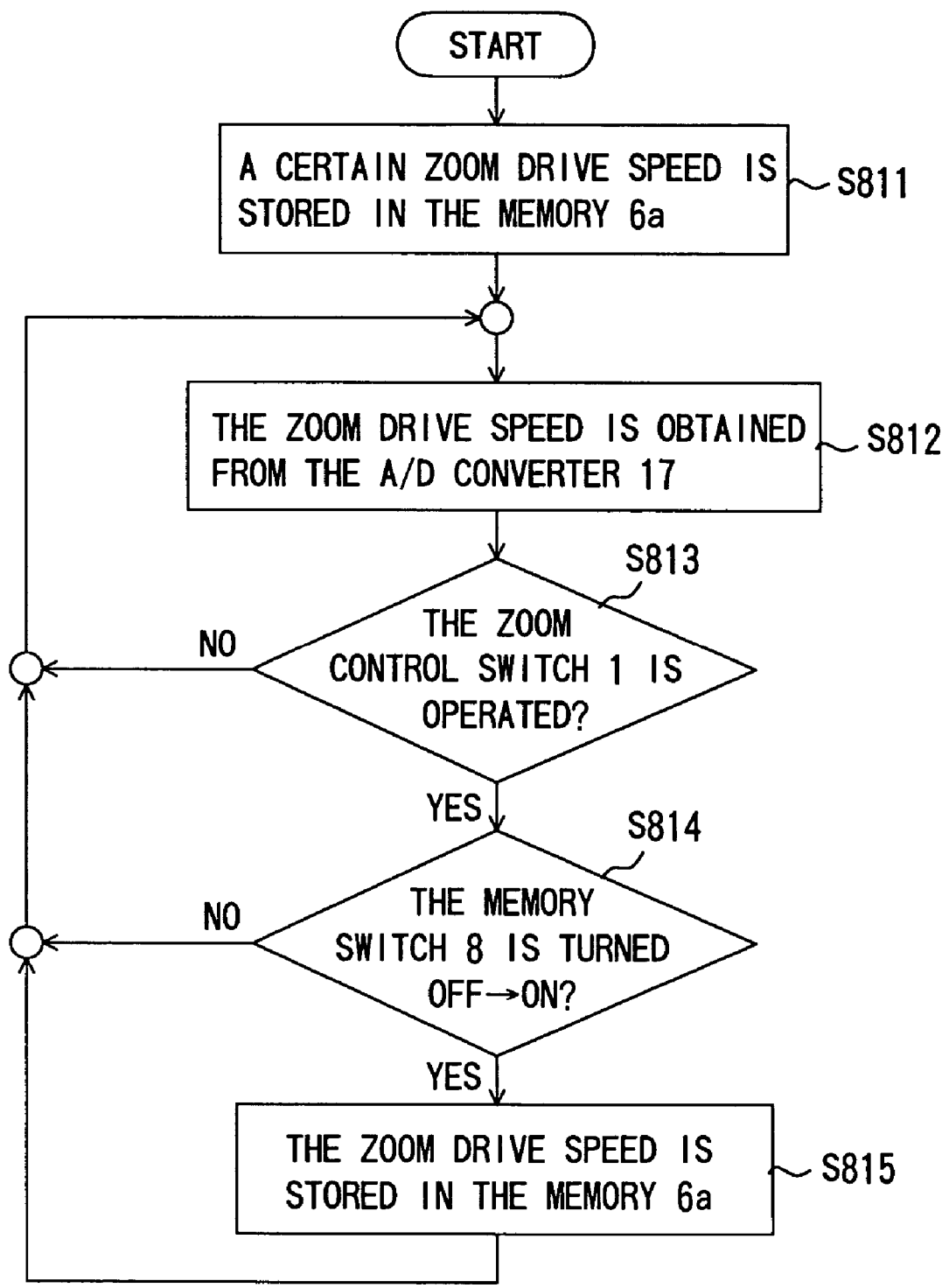
FIG. 10 is a flowchart showing a processing inside the CPU associated with the memory processing of the preset zoom speed according to Embodiment 1.

The processing of the CPU 6 at this time is explained by using a flowchart of FIG. 10. In the beginning, a predetermined zoom drive such as a maximum speed which enables driving the zoom lens unit 9 is stored as the preset speed in the preset speed memory as the initial setting (step 811). The preset speed at the time of this initial setting may be the zoom speed desired by the image-taker, or still more the zoom speed set in the midst of the previous time throwing in of the lens apparatus.

Next, the zoom speed is obtained (step 812) from the A/D converter 17. Thereafter, the data of the A/D converter 5 is obtained to judge whether or not the zoom control switch 1 is operated (step 813). In the case where the zoom control switch 1 is not operated, the process returns again to step 812 to obtain the zoom speed. In the case where the zoom control switch 1 has been operated, it is judged as to whether the memory switch 8 has changed from the OFF state to the ON state (step 814). In the case where the memory switch 8 has not changed from the OFF state to the ON state, the process returns to step 812 to obtain the zoom speed. In the case where the memory switch 8 has changed from the OFF state to the ON state, the zoom speed obtained at step 812 is stored in the memory 6a as a new preset speed (step 815).

Next, there will be explained the preset focus position memory processing. The setting of the preset position is such that the focus lens unit 25 is moved to the position which the image-taker desires in advance so that the CPU 6 stores as the preset position the position of the focus lens unit 25 (hereinafter referred to as the focus position) when the MP switch 7 has changed from the OFF state to the ON state in the state in which the memory switch 8 is turned on.

The processing of the CPU 6 at this time will be explained by using a flowchart of FIG. 11. In the beginning, a predetermined focus position of the NEAR end or the like is stored as a preset position in the memory 6a as the initial setting (step 821). The preset position at this initial setting time may be a focus position at the time of throwing-in of the power source of the lens apparatus and a focus position which the image-taker desires, and still more a focus position set in the midst of the previous time throwing-in of the power source of the lens apparatus.

Next, the position of the focus lens unit 25 is obtained from the A/D converter 36 (step 822). Thereafter, it is judged whether or not the memory switch 8 is turned on (step 823). In the case where the memory switch 8 is not turned on, the process returns again to step 822. In the case where the memory switch 8 is turned on, it is judged whether or not the MP switch 7 has changed from the OFF state to the ON state (step 824). In the case where the MP switch 7 has not changed from the OFF state to the ON state, the process returns to step 822. In the case where the MP switch 7 has changed from the OFF state to the ON state, the focus position obtained at step 822 is stored in the memory 6a as a new preset position (step 825).

Next, there will be explained the preset focus speed memory processing. The setting of the preset speed is such that the image-taker operates the focus control switch 21, and the CPU 6 stores as a preset speed the drive speed of the focus lens unit 9 (hereinafter referred to as the focus position) at the time of turning on from the OFF state of the memory switch 8 in the state in which drives the focus lens unit 25 at a speed which the image-taker desires to preset in advance.

In Embodiment 1, an instruction signal through an operation of the focus control switch 21 is described as a position signal. However, in the case where the speed is described, it is easier to set the speed servo in which the operation amount of the zoom lens unit 9 is given as a drive signal. The instruction signal from the focus control switch 21 may be a speed signal which is the same as the signal used for the drive of the zoom lens unit 9.

Figure 12:
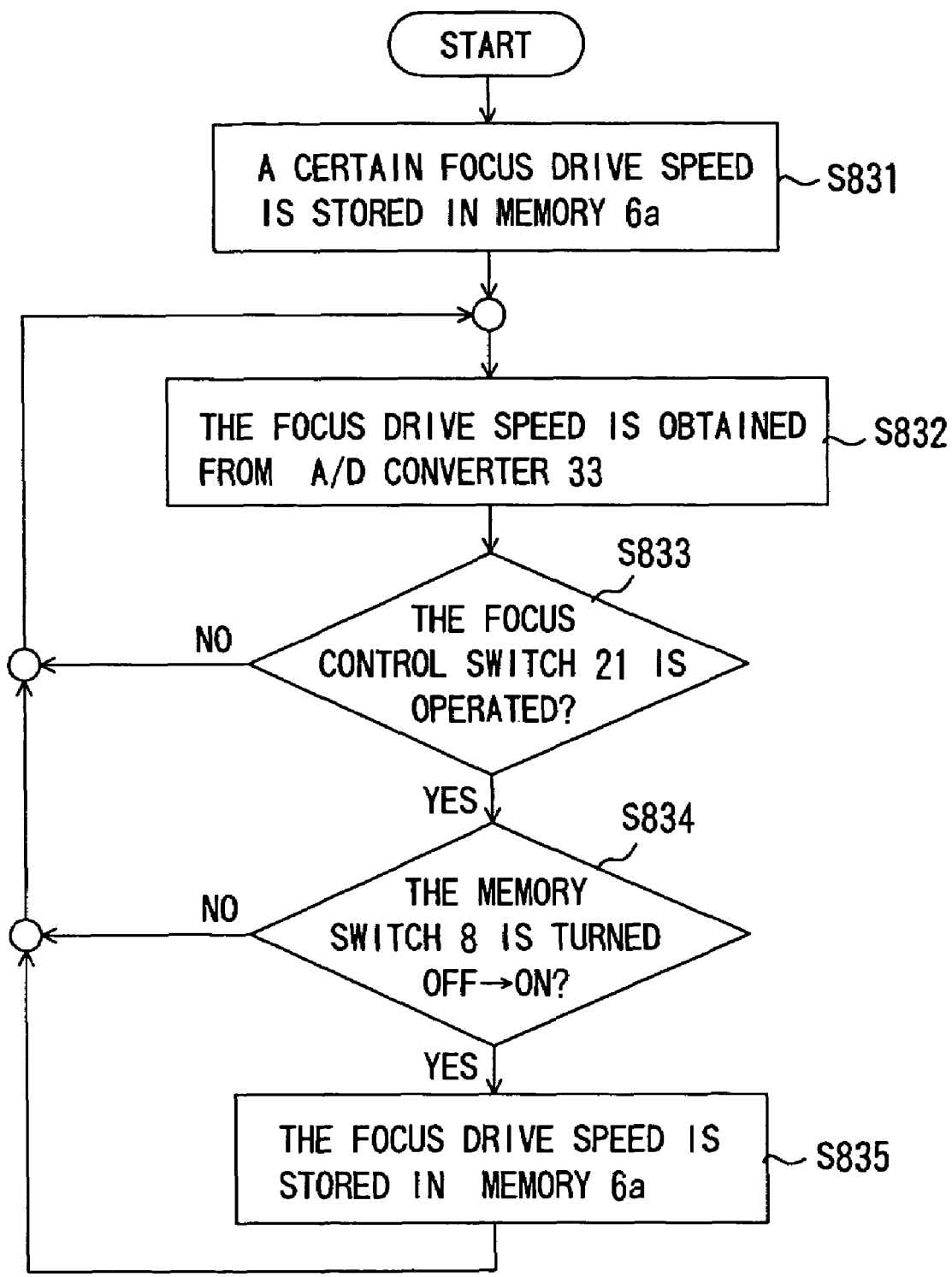
FIG. 12 is a flowchart showing a processing inside the CPU associated with the memory processing of a preset focus speed according to Embodiment 1.

There will be explained the processing of the CPU 6 at this time by using the flowchart of FIG. 12. In the beginning, a predetermined focus speed such as the maximum speed which enables driving the focus lens unit 25 is stored as the preset speed in the preset speed memory as the initial setting (step 831). The preset speed at this initial setting may be the focus speed which the image-taker desires, and still more a focus speed set in the midst of the previous time throwing in of the power source of the lens apparatus.

Next, the focus speed is obtained from the A/D converter 33 (step 832). Thereafter, the data of the A/D converter 24 is obtained to judge whether or not the focus control switch 21 is operated (step 833). In the case where the focus control switch 21 is not operated, the process returns to step 832 again to obtain the focus speed. In the case where the focus control switch 21 has been operated, it is judged whether or not the memory switch 8 has changed from the OFF state to the ON state (step 834). In the case where the memory switch 8 has not changed from the OFF state to the ON state, the process returns to step 832 to obtain the focus speed.

In the case where the memory switch 8 has changed from the OFF state to the ON state, the focus speed obtained at step 832 is set to be stored in the memory 6a as a new preset speed (step 835).

Thus, in addition to the memory processing of the preset position and the speed, in the present embodiment, the optical system of the object to be preset driven and controlled can be selected with the preset object selection switch 38. The preset object selection switch 38 can select one of the zoom, the focus and zoom+focus as a preset control object.

Figure 7:
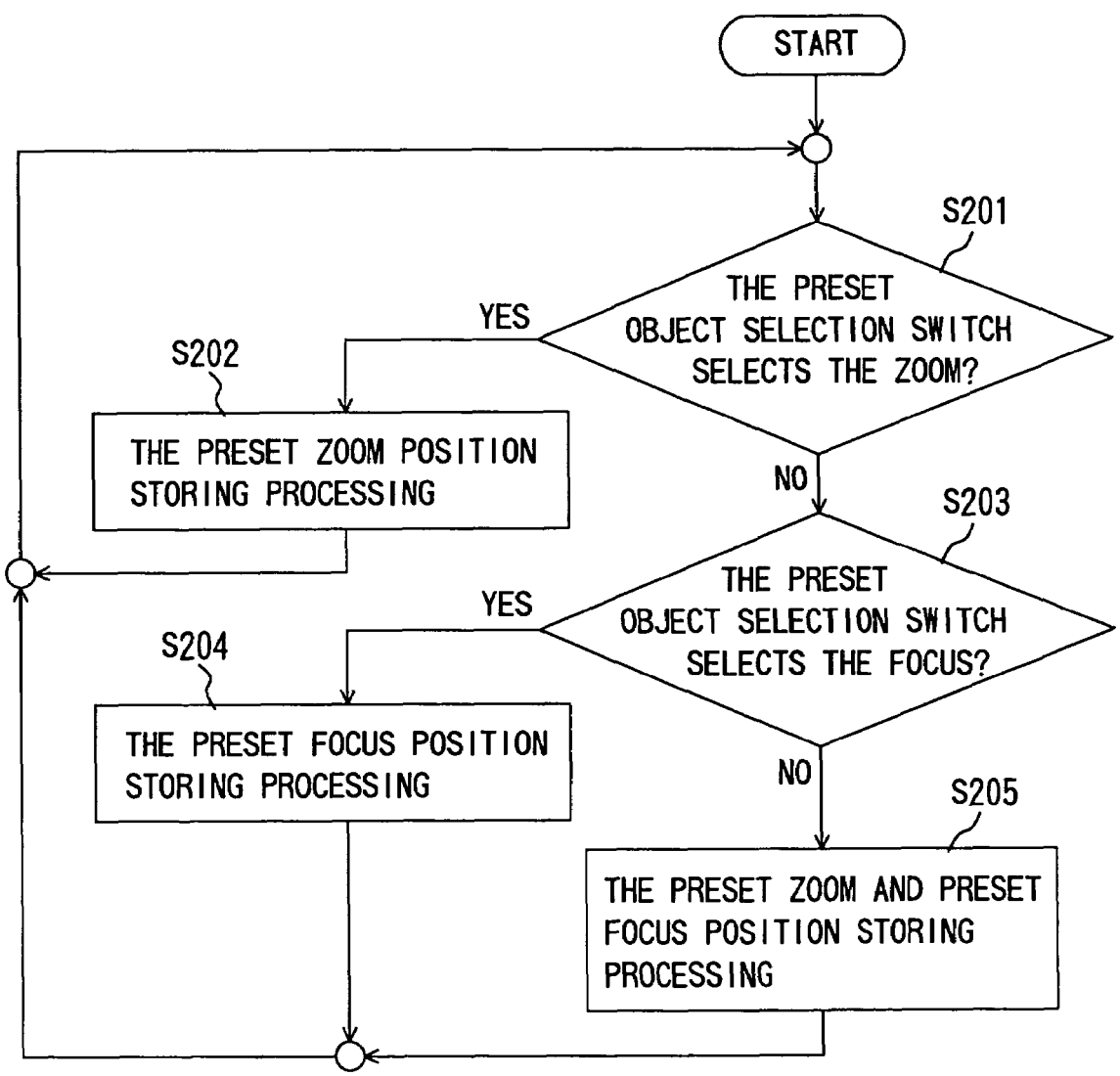
FIG. 7 is a flowchart showing a processing inside the CPU associated with a processing for selecting a preset control object according to Embodiment 1.

Hereinafter, there will be explained the processing in the CPU 6 in accordance with the preset object selection switch 38 at the time of memorizing the preset position by using a flowchart of FIG. 7.

In the beginning, it is judged whether or not the zoom lens unit 9 is selected with the preset object selection switch 38 (step 201). In the case where the zoom lens unit 9 is selected, the process proceeds to the preset zoom position memory processing (step 202) which will be explained in FIG. 9. In the preset zoom position memory processing, the zoom position is stored in the memory 6a. When the preset zoom position memory processing is completed, the process returns to step 201. In the case where the zoom lens unit 9 is not selected, the process proceeds to step 203 to judge whether or not the focus lens unit 25 is selected with the preset object selection switch 38.

Figure 11:
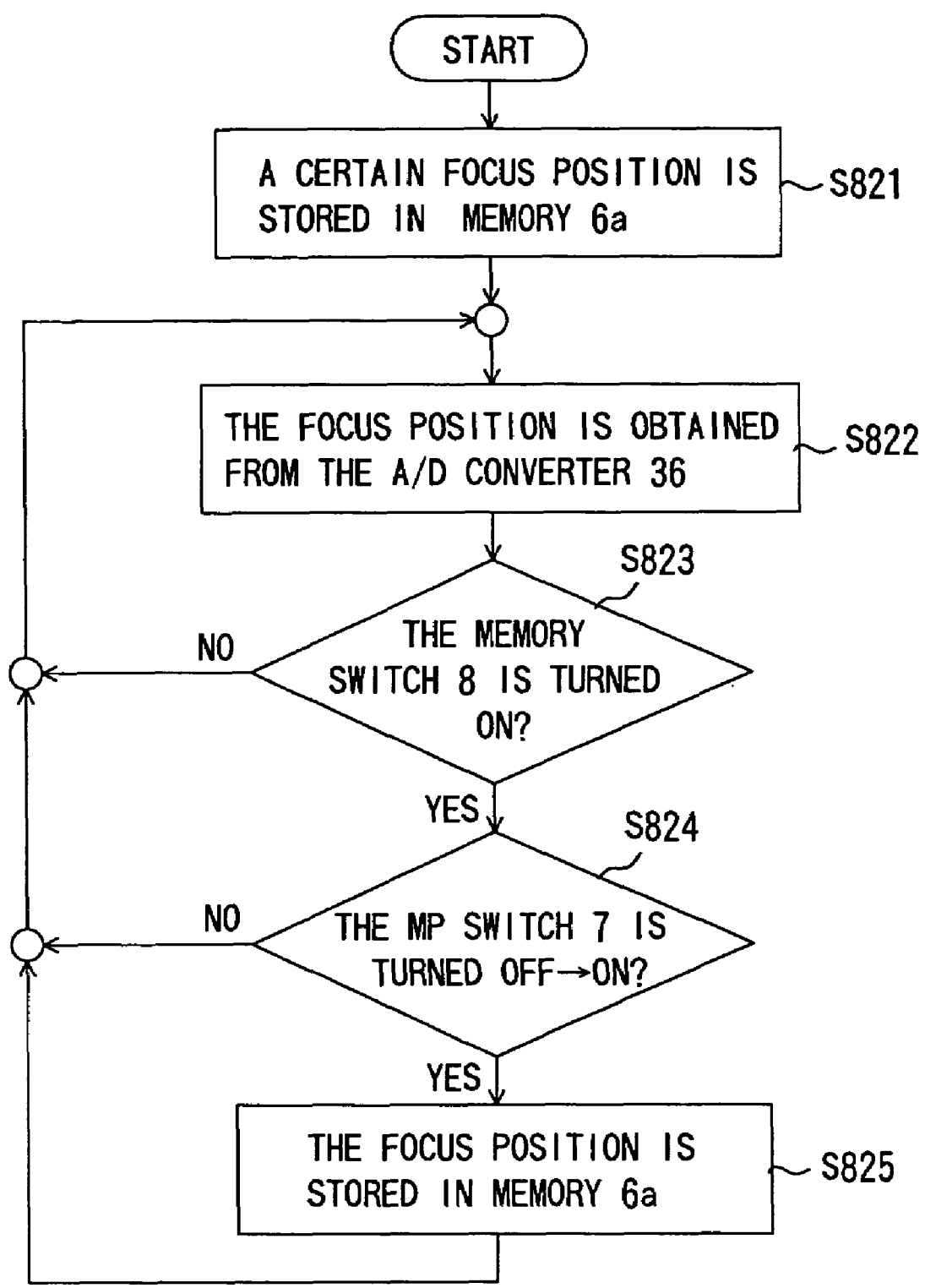
FIG. 11 is a flowchart showing a processing inside the CPU associated with the memory processing of the preset focus position according to Embodiment 1.

In the case where the focus lens unit 25 has been selected, the process proceeds to the preset focus position memory processing (step 204) which has been explained in FIG. 11. In the preset focus position memory processing, the focus position is stored in the memory 6a. In the case where the focus has not been selected, the preset focus position memory processing of both the zoom and the focus lens unit 9 and 25 will be performed (step 205).

Figure 13:
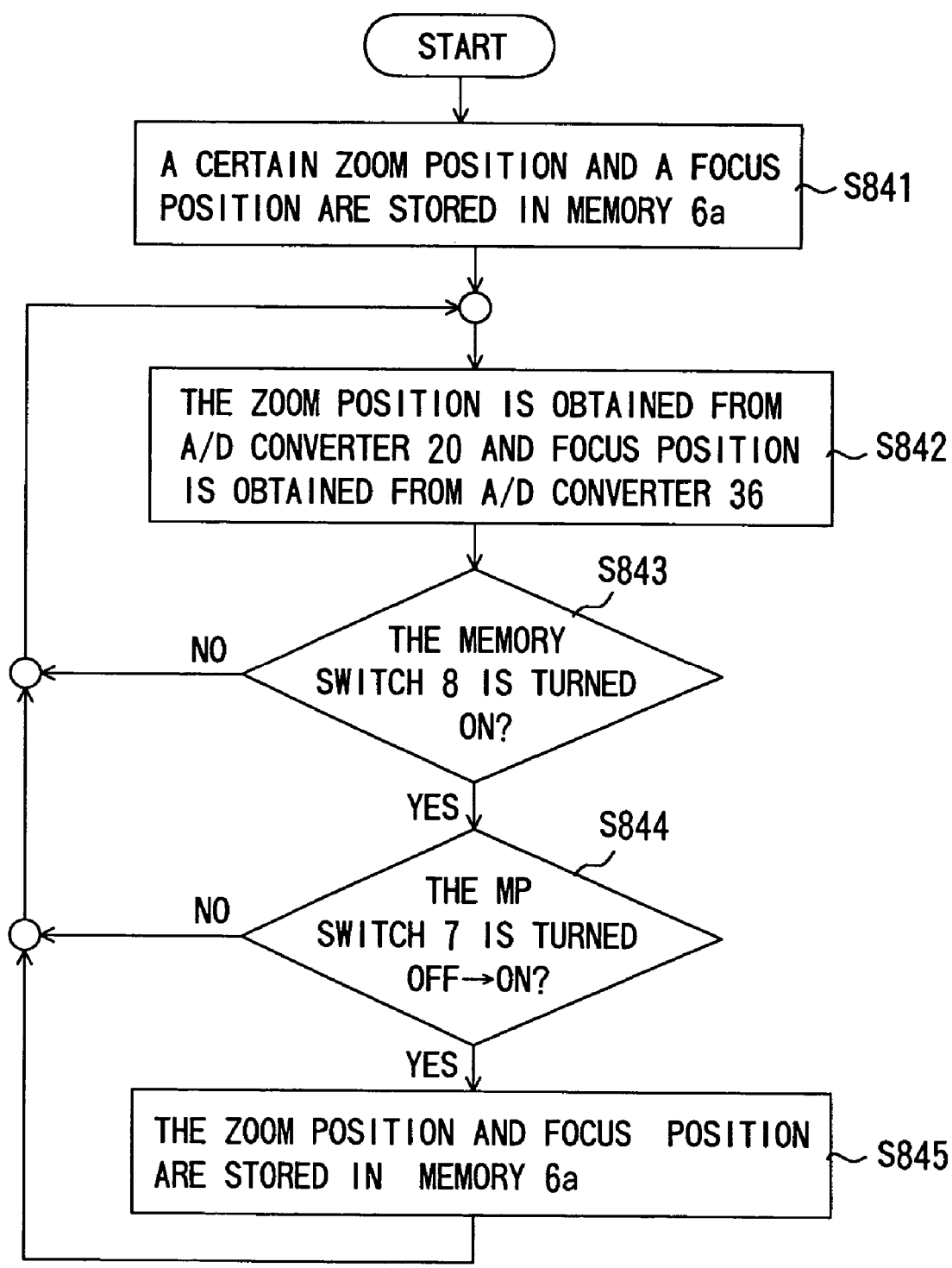
FIG. 13 is a flowchart showing a processing inside the CPU associated with a simultaneous memory processing of the preset zoom, and the preset focus position according to Embodiment 1.

Hereinafter, there will be explained the preset position memory processing of both the zoom and the focus by using a flowchart of FIG. 13.

As an initial setting, with respect to the focus lens unit 25, a predetermined focus position such as the NEAR end or the like is stored in the memory 6a as a preset position whereas with respect to the zoom lens unit 9 a predetermined zoom position such as the WIDE end or the like is stored in the memory 6a as the preset position (step 841).

Next, the focus position is obtained from the A/D converter 36 whereas the zoom position is obtained from the A/D converter 20 (step 842).

Thereafter, it is judged whether or not the memory switch 8 is turned on (step 843). In the case of where the memory switch 8 is not turned on, the process returns again to step 842. In the case where the memory switch 8 is turned on, it is judged whether or not the MP switch 7 has changed from the OFF state to the ON state (step 844). In the case where the MP switch 7 has not changed from the OFF state to the ON state, the process returns to step 842.

In the case where the MP switch 7 has changed from the OFF state to the ON state, the focus position and the zoom position obtained at step 842 is stored as new preset positions in the memory 6a (step 845).

When the preset zoom and preset focus position memory processing has completed, the process returns to step 201.

Figure 8:
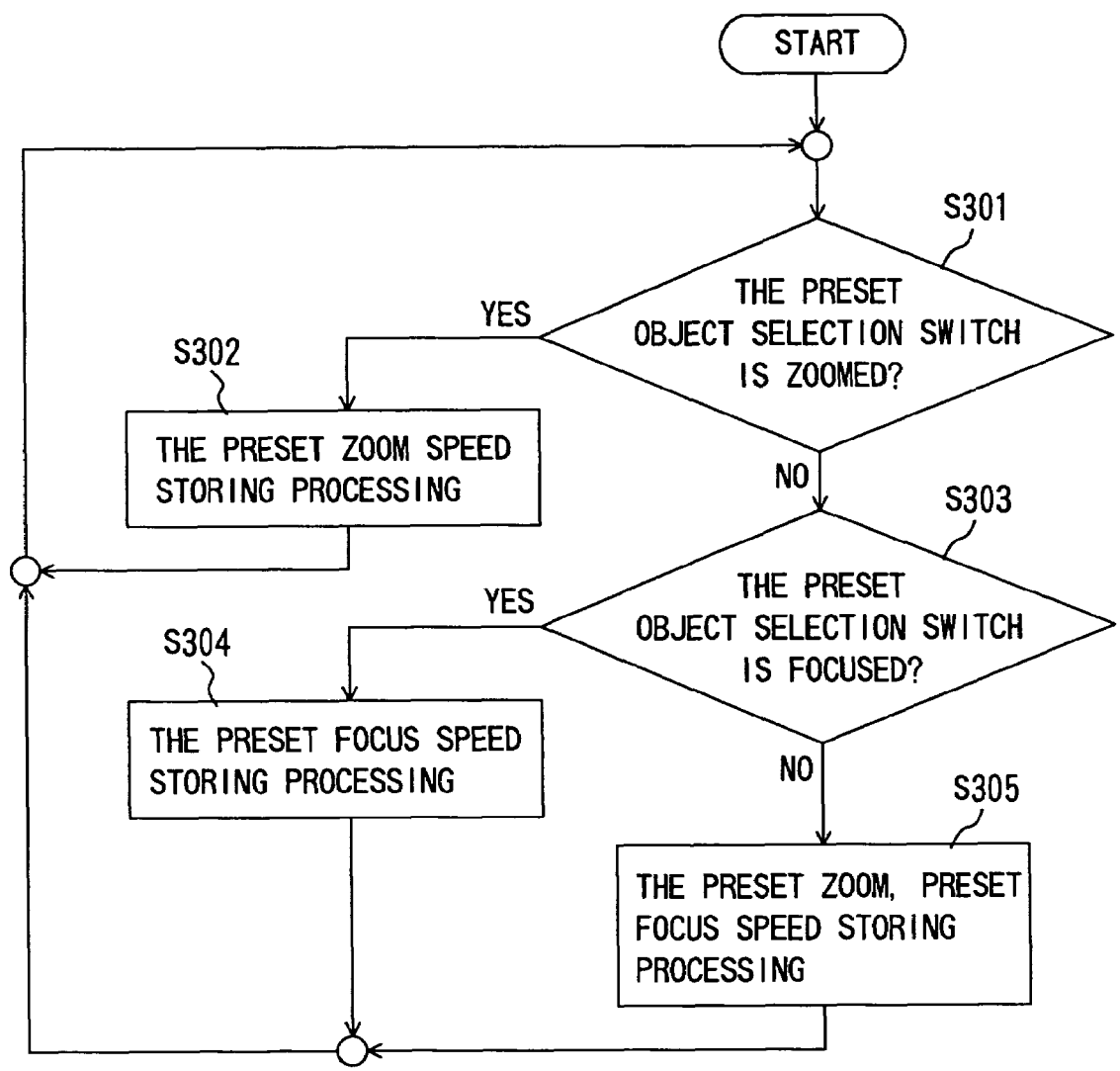
FIG. 8 is a flowchart showing a processing inside the CPU associated with a memory processing of a preset speed which is an object of the preset control according to Embodiment 1.

Subsequently, there will be explained the processing with the CPU 6 in accordance with the preset object selection switch 38 at the time of memorizing the preset speed by using a flowchart of FIG. 8.

In the beginning, it is judged whether or not the preset object selection switch 38 has selected the zoom lens unit 9 (step 301). In the case where the zoom lens unit 9 has been selected, the process proceeds to the preset zoom speed memory processing (step 302) which has been explained in FIG. 10. In the preset zoom speed memory processing, the zoom speed is stored in the memory 6a. After the preset zoom speed memory processing is completed, the process returns to step 301.

On the other hand, in the case where the zoom lens unit 9 is not selected, the process proceeds to step 303 to judge whether or not the preset object selection switch 38 selects the focus lens unit 25. In the case where the focus lens unit 25 has been selected, the process proceeds to the preset focus speed memory processing (step 304) which has been explained in FIG. 12. In the preset focus speed memory processing, the focus speed is stored in the memory 6a.

On the other hand, in the case where the focus lens unit 25 has not been selected, the preset speed memory processing of both the zoom and the focus lens unit 9 and 25 will be performed (step 305).

Figure 14:
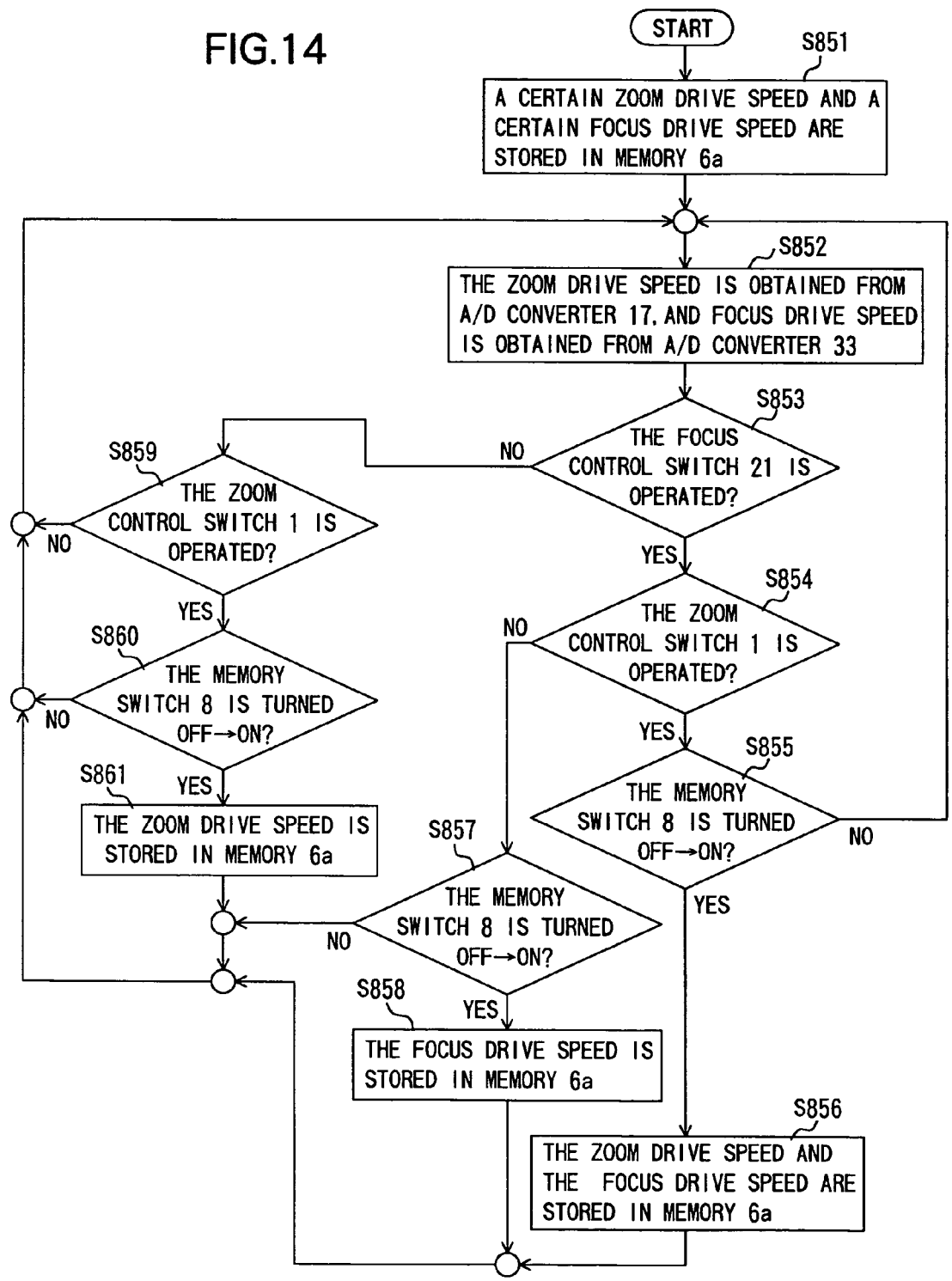
FIG. 14 is a flowchart showing a processing inside the CPU associated with a simultaneous memory processing of the preset zoom and the preset focus speed according to Embodiment 1.

Hereinafter, there will be explained the preset speed memory processing of both the zoom and the focus by using a flowchart of FIG. 14.

In the beginning, as an initial setting, a predetermined zoom speed and the focus speed such as the maximum speed or the like which enables driving the zoom lens unit 9 and focus lens unit 25 are stored in the memory 6a as a preset speed (step 851).

Next, the zoom speed is obtained from the A/D converter 17 and the focus speed is obtained from the A/D converter 33 (step 852). Thereafter, data of the A/D converter 24 is obtained to judge whether or not the focus control switch 21 is operated (step 853).

In the case where the focus control switch 21 is not operated, the process proceeds to step 859 to obtain the data of the A/D converter 5 thereby judging whether or not the zoom control switch 1 is operated.

In the case where the zoom control switch 1 is not operated, the process returns to step 852. In the case where the zoom control switch 1 has been operated, it is judged whether or not the memory switch 8 has changed from the OFF state to the ON state (step 860).

In the case where the memory switch 1 has not changed from the OFF state to the ON state, the process returns to step 852. In the case where the memory switch 8 has changed from the OFF state to the ON state, the zoom speed obtained at step 852 is stored in the memory 6a as a new preset zoom speed (step 861).

At step 853, it is judged whether or not the zoom control switch 1 is operated even in the case where the focus control switch 21 has been operated (step 854).

In the case where the zoom control switch 1 is not operated, the process proceeds to step 857 to judge whether or not the memory switch 8 has changed from the OFF state to the ON state. In the case where the memory switch 8 has not changed from the OFF state to the ON state, the process returns to step 852. In the case where the memory switch 8 has changed from the OFF state to the ON state, the focus speed obtained at step 852 is stored in the memory 6a as a new preset focus speed (step 858).

At step 854, in the case where the zoom control switch 1 has been operated, the process proceeds to step 855 to judge whether or not the memory switch 8 has changed from the OFF state to the ON state. In the case where the memory switch 8 has not changed from the OFF state to the ON state, the process returns to step 852. In the case where the memory switch 8 has changed from the OFF state to the ON state, the focus speed obtained at step 852 is stored in the memory 6a as a new preset focus speed and the zoom speed obtained at step 852 is stored in the memory 6a as a new preset zoom speed (step 856).

In a manner described above, in Embodiment 1, the selection of the optical system which becomes an object of the preset drive control can be selected by the setting of the preset object selection switch 38.

Furthermore, in Embodiment 1, the drive speed of the zoom lens unit 9 and the focus lens unit 25 can be selected with the preset speed selection switch 39. The preset speed selection switch 39 has the following modes which can be selected. Namely, the modes include the "maximum speed mode", the "preset speed mode", the "zoom speed optimal mode", the "focus speed optimal mode", the "high speed optimal mode", and the "low speed optimal mode". In these modes, the set conditions of the drive speed of the zoom lens unit 9 and the focus lens unit 25 are different from each other. Hereinafter, each of the modes will be explained.

The "maximum speed mode" is a mode in which the zoom lens unit 9 and the focus lens unit 25 are driven at the maximum speed at which those units 9 and 25 respective systems can be driven at the time of the preset drive control. In the case of this mode, even if the predetermined zoom speed and the predetermined focus speed are stored in the memory 6a as a preset speed, the zoom lens unit 9 and the focus lent unit 25 are driven at each of the maximum speed at the time of the preset drive control.

The "preset speed mode" is a mode in which the preset drive control of the zoom lens unit 9 and the focus lens unit 25 is performed at the preset speed stored in the memory 6a.

In the "zoom speed optimal mode", in the case where the zoom lens unit 9 and the focus lens unit 25 are both preset drive controlled, the preset drive control of the zoom lens unit 9 is performed at the zoom speed (the zoom preset speed) stored in the memory 6a while the preset drive control of the focus lens unit 25 to the preset position (the focus preset position) is simultaneously performed. In this case, the drive time (the zoom drive time) from the current position of the zoom drive unit 9 to the zoom preset position is calculated, and the drive speed is calculated to enable the focus lens unit 25 to move up to the focus preset position at the zoom drive time with respect to the focus lens unit 25. Then the preset drive control of the zoom lens unit 9 and the focus lens unit 25 are substantially simultaneously completed by driving the focus lens unit 25 up to the focus preset position at the calculated drive speed. Incidentally, in the case where the calculated drive speed of the focus lens unit 25 exceeds the maximum speed at which the focus lens unit 25 can be driven, the drive speed of the focus lens unit 25 is set to the maximum speed.

In the "focus speed optimal mode", in the case where both the zoom lens unit 9 and the focus lens unit 25 are preset driven and controlled, the preset drive control of the focus lens unit 25 is performed at the focus speed (the focus preset speed) which is stored in the memory 6a while the preset drive control to the preset position (the zoom preset position) of the zoom lens unit 9 is simultaneously performed. In this case, the drive time (the focus drive time) required from the current position of the focus lens unit 25 to the focus preset position is calculated. With respect to the zoom lens unit 9, the drive speed is calculated in such a manner that the zoom lens unit 9 can be moved to the zoom preset position in the focus drive time. Then, the preset drive control of both the zoom lens unit 9 and the focus lens unit 25 are completed substantially approximately simultaneously by driving the zoom lens unit 9 up to the zoom preset position at the drive speed calculated above. Incidentally, in the case where the calculated drive speed of the zoom lens unit 9 exceeds the maximum speed at which the zoom lens unit 9 can be driven, drive speed of the zoom lens unit 9 is set to the maximum speed.

In the "high optimal speed", in the case where both the zoom lens unit 9 and the focus lens unit 25 are preset driven and controlled, the other drive speed is calculated in such a manner that the drive completion time is allowed to agree with the shorter of the drive time up to the preset position at the drive time at the respective preset speeds of the zoom lens unit 9 and the focus lens unit 25 when the zoom speed (the zoom preset speed) and the focus speed (the focus preset speed) are stored in the memory 6a. Then the other preset drive control is performed at the drive speed.

Incidentally, the zoom lens unit 9 and the focus lens unit 25 are driven at the maximum speed in the case where the longer drive time at the time of driving at the preset speed exceeds the maximum speed at which the unit can be driven.

In the "low speed optimal mode", in the case where both the zoom lens unit 9 and the focus lens unit 25 are preset driven and controlled, the other drive speed is calculated in such a manner that the drive completion time is allowed to agree with the longer of the drive time up to the preset position at the drive time at respective preset speeds of the zoom lens unit 9 and the focus lens unit 25 when the zoom speed (the zoom preset speed) and the focus speed (the focus preset speed) are stored in the memory 6a. Then, the other preset drive control is performed at the drive speed.

Figure 15:
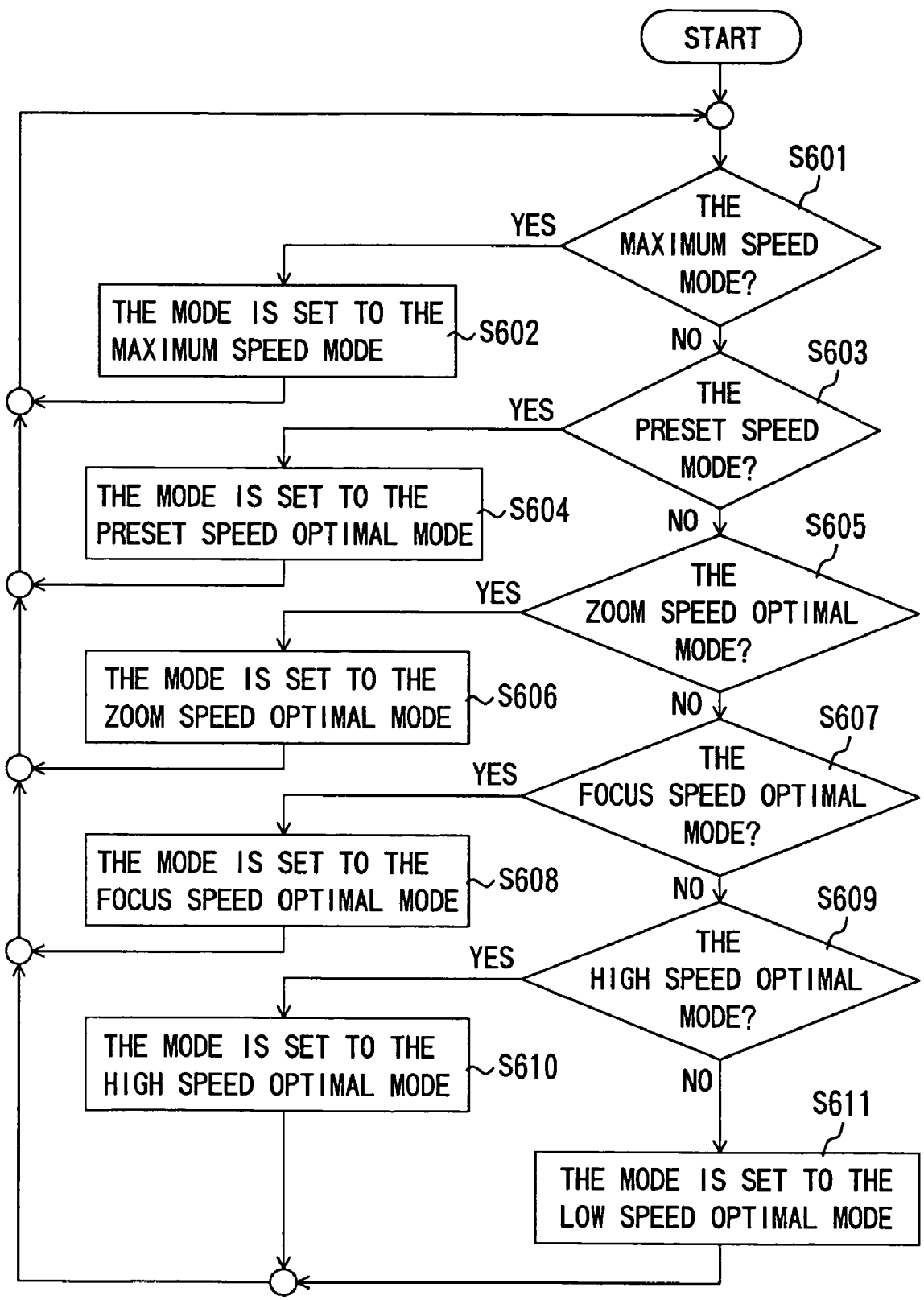
FIG. 15 is a flowchart showing a processing inside the CPU associated with the mode selection according to Embodiment 1.

Hereinafter, there will be explained the processing at the CPU 6 by using a flowchart of FIG. 15. The preset speed selection switch 39 is formed as a switch which can be changed over by the user, and the setting can be detected by the CPU 6.

Then, the CPU 6 judges whether or not the preset speed selection switch 39 is set in the maximum speed mode (step 601). In the maximum speed mode, the mode of the preset speed is set to the maximum mode (step 602). When this set mode is the maximum speed mode, in the main operation which will be described later, the speed of the preset drive control will be determined. When the mode is not the maximum speed mode, it is judged whether or not the preset speed selection switch 39 is set in the preset speed mode (step 603). When the mode is the preset speed mode, the mode setting of the preset speed is set to the preset speed mode (step 604).

When the mode is not the preset speed mode, it is judged whether or not the preset speed selection switch 39 is set to the zoom speed optimal mode (step 605). When the mode is the zoom speed optimal mode, the mode setting of the preset speed is set to the zoom speed optimal mode (step 606).

When the mode is not the zoom speed optimal mode, the preset speed selection switch 39 judges whether or not the mode is set to the focus speed optimal mode (step 607). When the mode is the focus speed optimal mode, the mode setting of the preset speed is set to the focus speed optimal mode (step 608).

When the mode is not the focus speed optimal mode, it is judged whether or not the preset speed selection switch 39 is set to the high speed optimal mode (step 609). When the mode is the high speed optimal mode, the mode setting of the preset speed is set to the high speed optimal mode (step 610).

When the mode is not the high speed optimal mode, the process proceeds to step 611 to set the mode setting of the preset speed to the low speed optimal mode.

Next, a main operation of the CPU 6 in Embodiment 1 will be explained by using the FIG. 1 and flowcharts of FIGS. 2 through 5. Incidentally, in FIGS. 3A and 3B, 4A and 4B, and 5A and 5B, there is shown a state in which a portion denoted with a rounded character are connected to each other.

Figure 2:
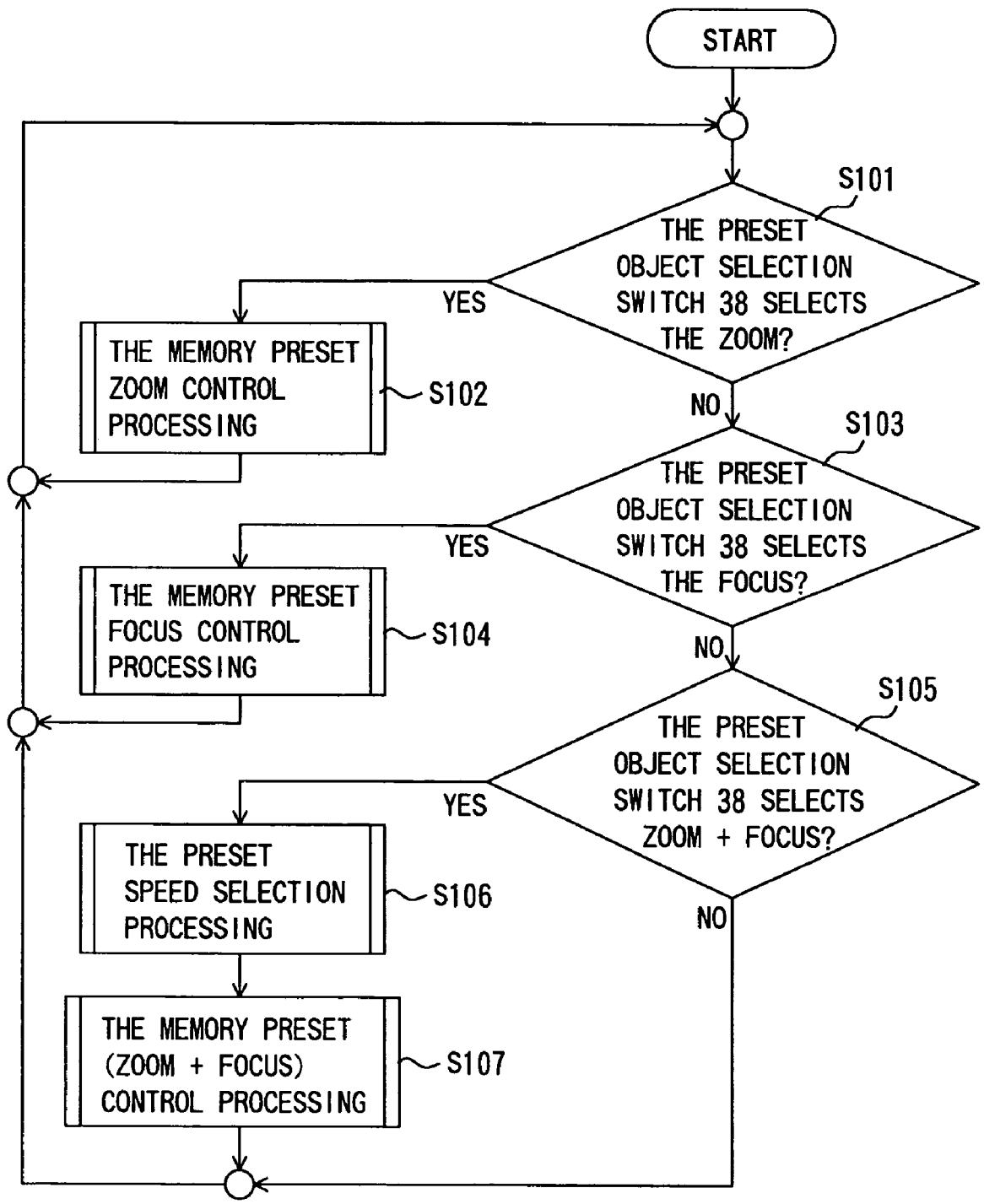
FIG. 2 is a main flowchart showing a processing inside the CPU according to Embodiment 1.

In the beginning, in FIG. 2, the CPU 6 confirms as to whether the preset object selection switch 38 selects the zoom lens unit 9 in order to confirm the object of the preset drive control (step 101). In the case where the zoom lens unit 9 has been selected, the process proceeds to the memory preset zoom control processing (step 102). Here, the details of the memory preset zoom control processing will be explained with the flowchart of FIGS. 3A and 3B. Incidentally, a method for memorizing the preset zoom position and the preset zoom speed is performed as has been described above.

Figure 3A:
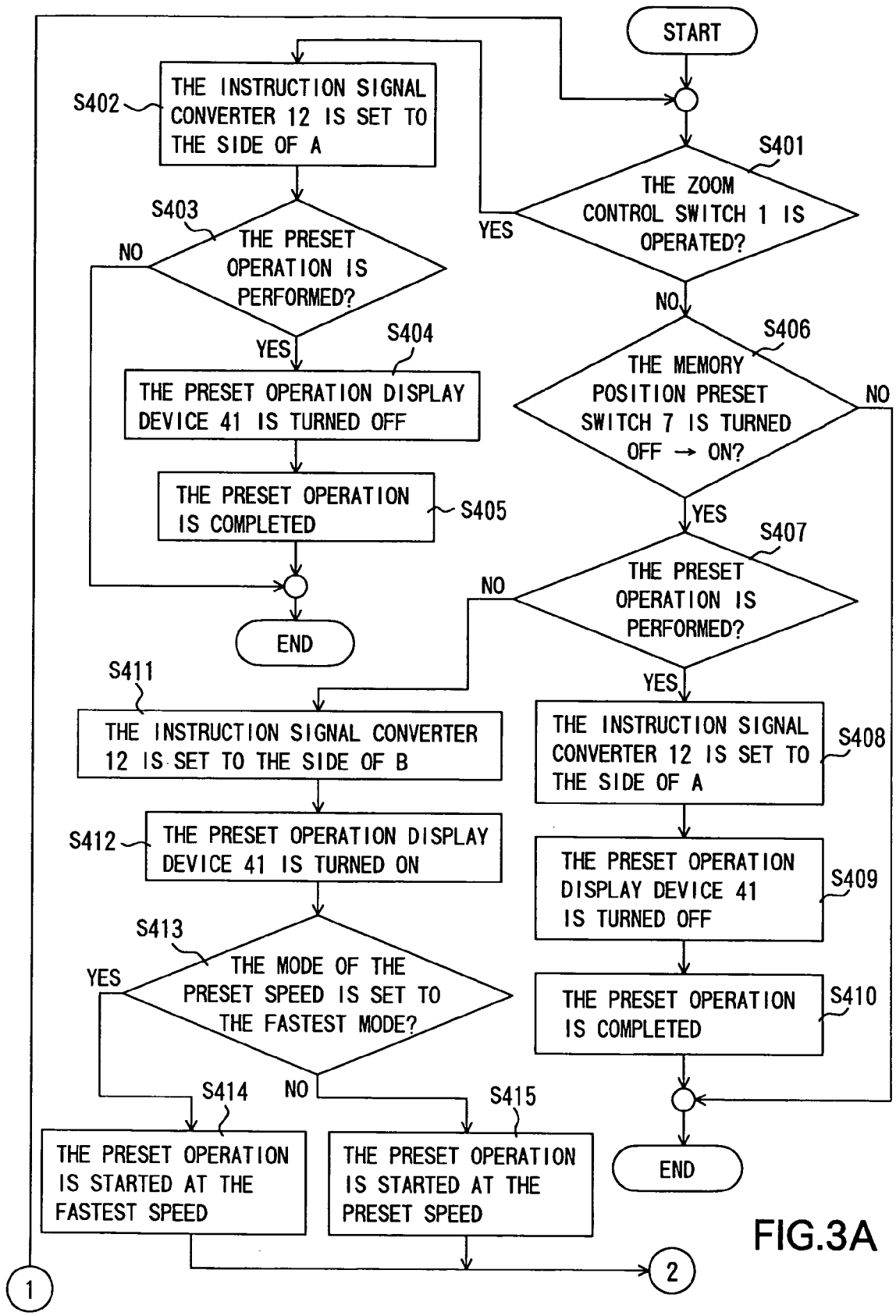
FIG. 3 is a flowchart showing a processing inside the CPU associated with the memory preset zoom control according to Embodiment 1.
Figure 4A:
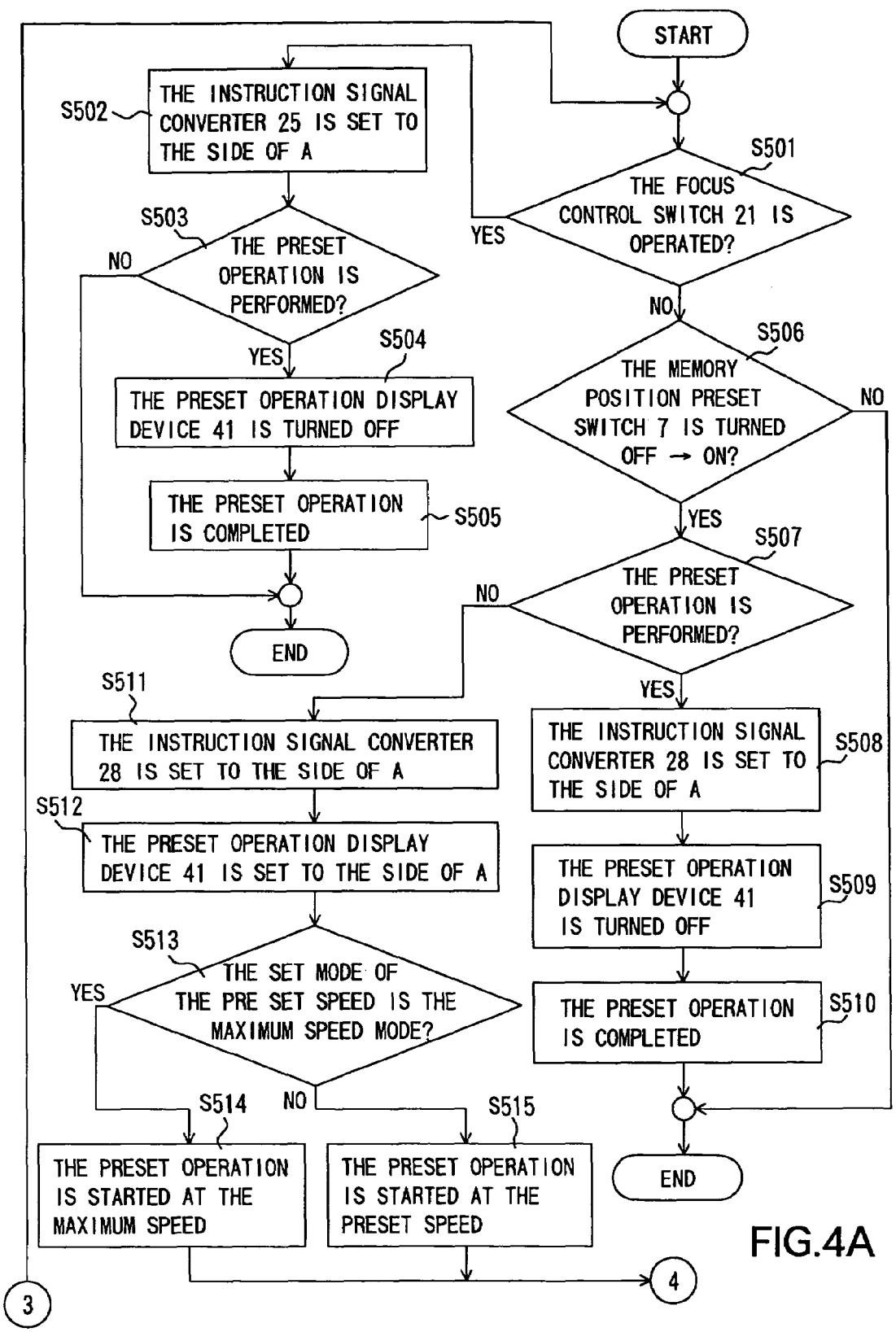
FIG. 4 is a flowchart showing a processing inside the CPU associated with the memory preset focus control according to Embodiment 1.
Figure 4B:
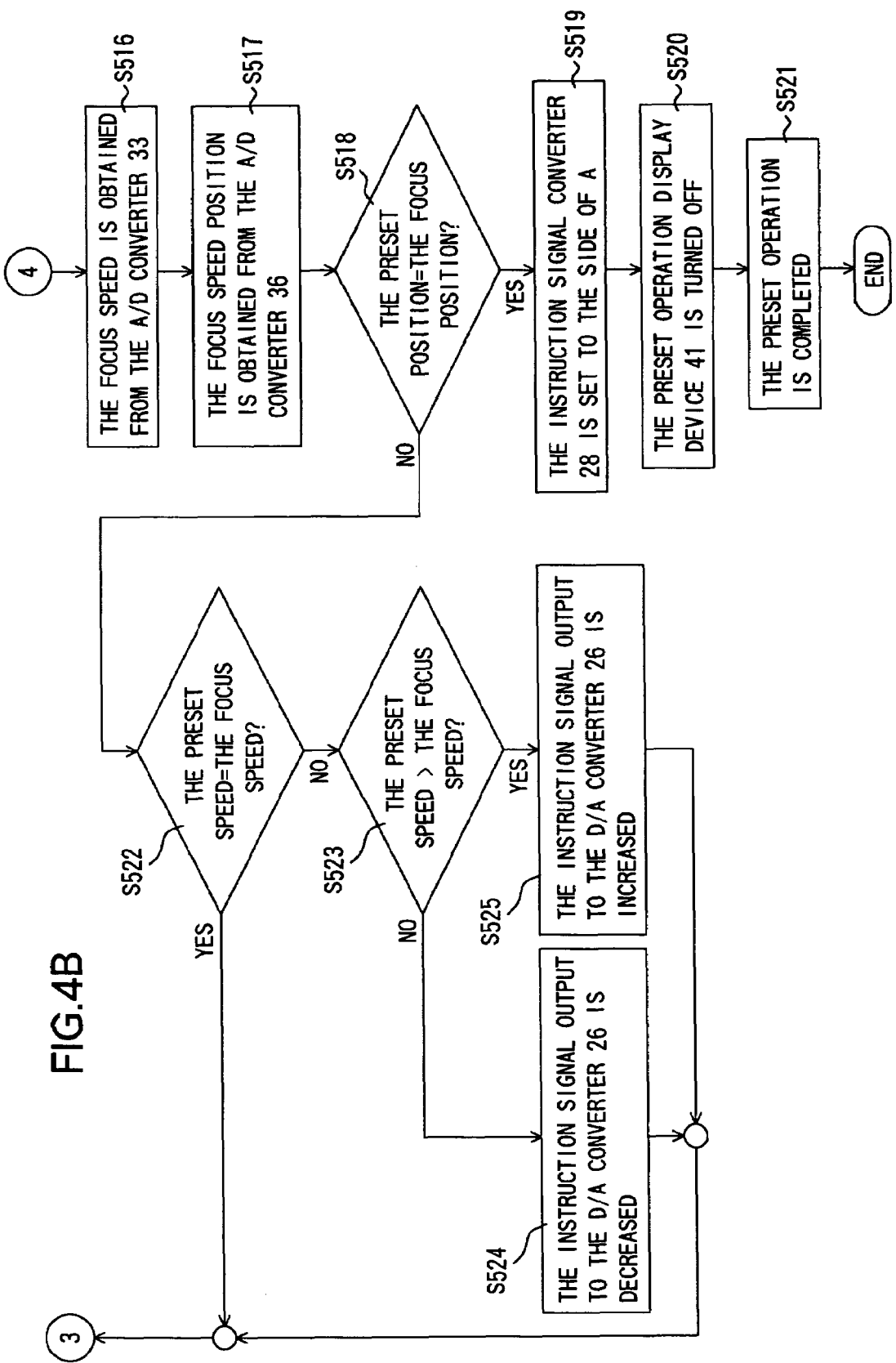
Figure 5A:
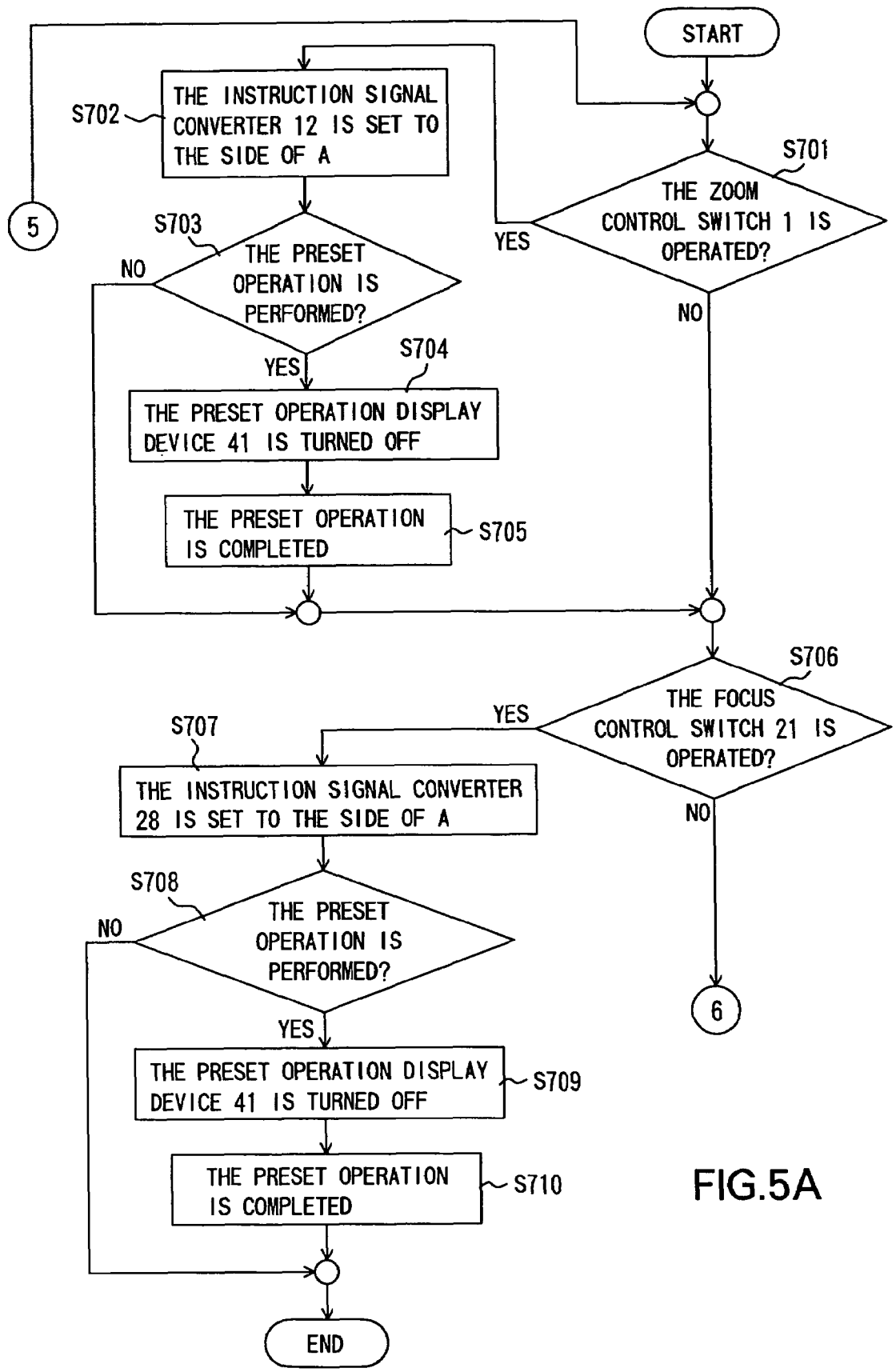
FIG. 5 is a flowchart showing a processing inside the CPU associated with the memory preset (zoom+focus) control according to Embodiment 1.
Figure 5B:
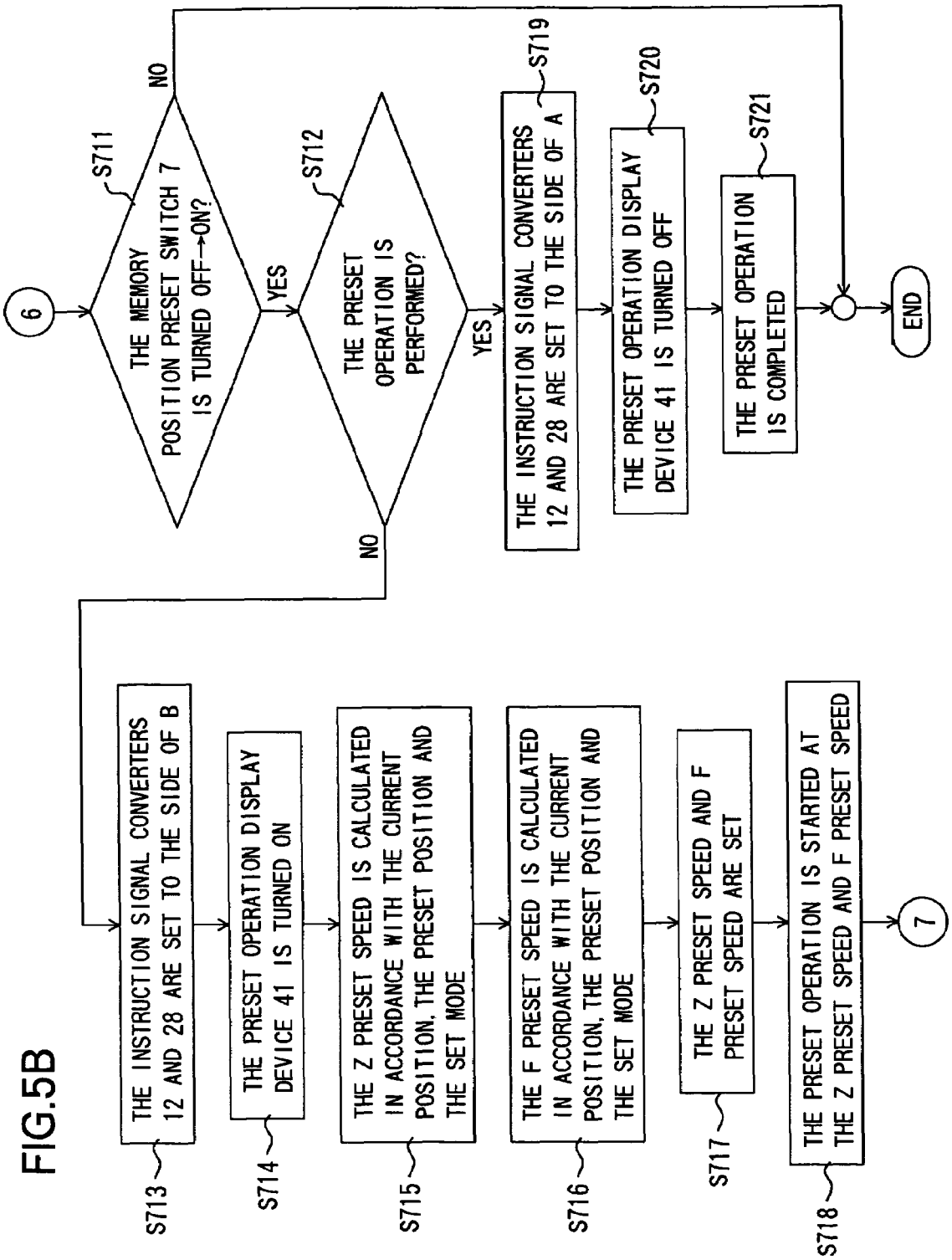
Figure 6A:
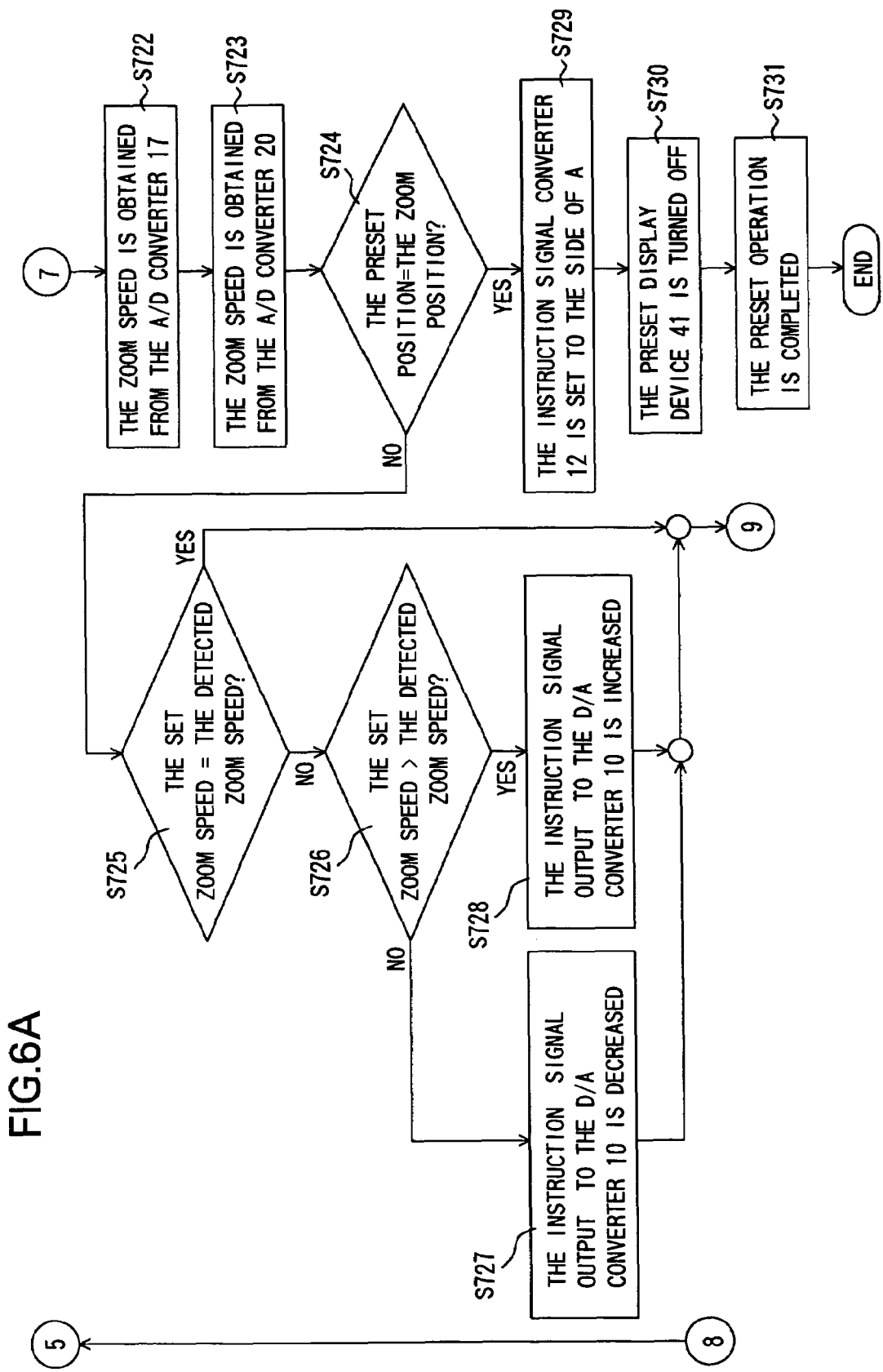
FIG. 6 is a flowchart showing a processing inside the CPU associated with the memory preset (zoom+focus) control according to Embodiment 1.
Figure 6B:
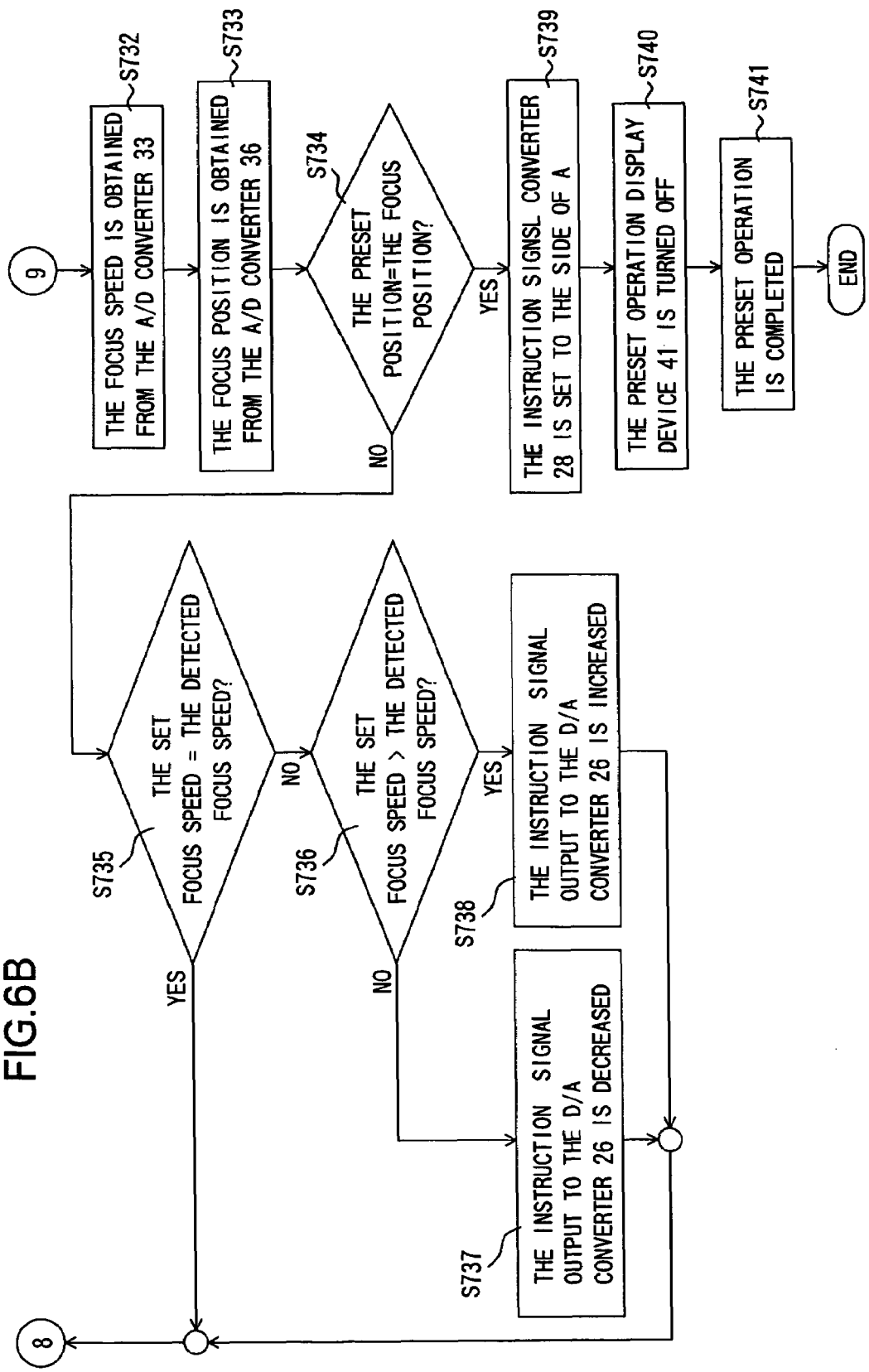

In FIGS. 3A and 3B, the CPU 6 judges whether or not the zoom control switch 1 has been operated (step 401). In the case where the zoom control switch 1 is operated, the instruction signal shifter 12 is converted to the side of A (step 402) in order to perform the control of the zoom lens unit 9 from the control switch 1, thereby judging the preset drive control is performed, namely, the preset operation is being operated (step 403). In the case where the preset operation is not being performed, this flow is completed. In the case where the preset operation is being performed, the preset operation display device 41 is turned off (step 404). Thereafter the preset drive control is completed (step 405) to complete this flow.

In the case where the zoom control switch 1 is not operated, it is judged whether or not the memory position preset (MP) switch 7 has changed from the OFF state to the ON state (step 406). In the case where the MP switch 7 has not changed from the OFF state to the ON state, this flow is completed.

On the other hand, in the case where the MP switch 7 has changed from the OFF state to the ON state, it is judged whether or not the preset operation is being operated (step 407). In the case where the preset operation is being operated, the instruction signal shifter 12 is changed, to the side of A (step 408) to turn off the preset operation display device 41 (step 409). Thus, the preset drive control is completed (step 410) to complete this flow.

In the case where the preset operation is not being operated, the instruction signal shifter 12 is shifted to the side of B (step 411) to turn on the preset operation display device 41 (step 412) thereby judging whether or not the mode setting of the preset speed selection switch 39 is set to the maximum speed mode (step 413).

When the mode is set to the maximum speed, the preset drive control is started (step 414) at the maximum speed. When the mode is not set to the maximum speed mode, the preset drive control is started (step 415) at the preset speed stored in the memory 6a.

Next, in order to confirm the zoom speed and the zoom position, the zoom speed is obtained from the A/D converter 17 (step 416) while the zoom position is obtained from the A/D converter 20 (step 417).

Next, it is judged whether or not the zoom position which has been obtained at step 417 agrees with the preset position which has been stored in advance (step 418). In the case where the zoom position and the preset positions are equal to each other, the instruction signal shifter 12 is shifted to the side of A (step 419) to turn off the preset operation display device 41 (step 420). Thereafter, the preset drive control is completed (step 421) to complete this flow.

In the case where the zoom position and the preset positions are not equal to each other, it is judged whether or not the zoom speed obtained at step 416 and the preset speed which is stored in advance agree with each other (step 422). In the case where the zoom speed and the preset speed are not equal to each other, it is judged whether or not the preset speed is faster than the zoom speed (step 423). In the case where the preset speed is faster than the zoom speed, the instruction signal output to the D/A converter 10 is increased (step 425). In the case where the preset speed is slower than the zoom speed, the instruction signal output to the D/A converter 10 is deceased (step 424).

Then, the process returns to a judgment on whether or not the zoom control switch 1 is operated (step 401). In addition, in the case where the zoom speed and the preset speed which is stored in advance are equal to each other at step 422 as well, the process returns to the judgment on whether or not the zoom control switch 1 is operated (step 401).

Thus, an explanation on the memory preset zoom control processing has been completed. When the memory preset zoom control processing is completed in this manner, the process returns to a judgment on whether or not the preset object selection switch 38 selects the zoom (step 101). In the case where the zoom lens unit 9 is not selected at step 101, the process proceeds to a judgment on whether or not the preset object selection switch 38 selects the focus (step 103).

In the case where the focus lens unit 25 has been selected at step 103, the process proceeds to the memory preset focus control processing (step 104). Here, the details of the memory preset focus control processing will be explained by using the flowcharts of FIGS. 4A and 4B. The method for memorizing the focus preset position and the focus preset speed is performed as described above.

In the beginning, the CPU 6 judges whether or not the focus control switch 21 is operated (step 501). In the case where the focus control switch 21 is operated, the instruction signal shifter 28 is shifted to the side of A in order to perform the control of the focus lens unit 25 by using the focus control switch 21 (step 502). Then, it is judged as to whether the preset operation is performed (step 503). When the preset operation is not performed, this flow is completed.

On the other hand, when the preset operation is performed, the preset operation display device 41 is turned off (step 504) followed by completing the control of the preset drive (step 505) and completing this flow.

In the case where the focus control switch 21 is not operated, it is judged whether or not the MP switch 7 has changed from the OFF state to the ON state (step 506). In the case where the MP switch 7 has not changed from the OFF state to the ON state, this flow is completed.

On the other hand, in the case where the MP switch 7 has changed from the OFF state to the ON state, it is judged whether or not the preset operation is performed (step 507). In the case where the preset operation is performed, the instruction signal shifter 28 is shifted to the side of A (step 508). Then, the preset operation display device 41 is turned off (step 509) followed by completing the preset drive control (step 510) and completing this flow.

On the other hand, when the preset operation is not performed, the instruction signal shifter 28 is shifted to the side of B (step 511) to turn on the preset operation display device 41 (step 512) thereby judging whether or not the mode setting of the preset speed selection switch 39 is set to the maximum mode (step 513). When the mode is set to the maximum speed mode, the preset drive control of the focus lens unit 25 is started at the maximum speed (step 514).

On the other hand, when the mode is not set to the maximum speed mode, the preset drive control is started at the preset speed which is stored in the memory 6*a* (step 515).

Next, in order to confirm the focus speed and the focus position, the focus speed is obtained from the A/D converter 33 (step 516) whereas the focus position is obtained from the A/D converter 36 (step 517).

Next, it is judged whether or not the focus position obtained at step 517 and the preset position which is stored in advance are equal to each other (step 518). In the case where the focus position and the preset position are equal to each other, the instruction signal shifter 28 is converted to the side of A (step 519). Then, the preset operation display device 41 is turned off (step 520) to complete the preset drive control after that (step 521). Then, this flow is completed.

In the case where the focus position and the preset position are not equal to each other at step 518, it is judged whether or not the focus speed obtained at step 516 and the preset speed which is stored in advance are equal to each other (step 522). In the case where the focus speed and the preset speed are not equal to each other, it is judges whether or not the preset speed is faster than the focus speed (step 523). In the case where the preset speed is faster than the focus speed, the instruction signal output to the D/A converter 26 is increased (step 525). In the case where the preset speed is slower than the focus speed, the instruction signal output to the D/A converter 26 is decreased (step 524). Then, the process returns to a judgment on whether or not the focus control switch 21 is operated (step 501).

In the case where the focus speed and the preset speed which is stored in advance are equal to each other at step 522, as well, the process returns to a judgment on whether or not the focus control switch 21 is operated (step 501).

Thus, an explanation on the memory preset focus control processing is completed. When the memory preset focus control processing is completed, the process returns to a judgment on whether or not the preset object selection switch 38 selects the zoom (step 101).

In the case where the focus lens unit 25 is not selected at step 103, the preset object is not only the zoom lens unit 9 or only the focus lens unit 25, but the preset object is both the zoom lens units 9 and the focus lens unit 25. In Embodiment 1, when the zoom lens unit 9 and the focus lens unit 25 is calculated for each of the maximum speed mode, the preset speed mode, the zoom speed optimal mode, the focus speed optimal mode, the high speed optimal mode and the low speed optimal mode which are selected with the preset speed selection switch 38 with the result that the preset speed of the zoom and the focus are set and the preset operation is performed at the preset speed (step 106). Hereinafter, the details of the memory preset (zoom+focus) control processing will be explained by using flowcharts of FIGS. 5A and 5B and FIGS. 6A and 6B. Incidentally, a method of simultaneously memorizing the preset zoom position, the preset focus position, the preset zoom speed and the preset focus speed is performed as has been described above. Hereinafter, the details of the memory preset (zoom+focus) control processing will be explained by using flowcharts of FIGS. 5A and 5B and FIGS. 6A and 6B. Incidentally, a method of simultaneously memorizing the preset zoom position, the preset focus position, the preset zoom speed and the preset focus speed is performed as has been described above.

In the beginning, the CPU 6 judges whether or not the zoom control switch 1 is operated (step 701). In the case where the zoom control switch 1 is operated, the instruction signal shifter 12 is shifted to the side of A (step 702) in order to perform the control of the zoom lens unit 9 by using the zoom control switch 1. Then, it is judged whether or not the preset operation is performed (step 703). In the case where the preset operation is not performed, the process proceeds to step 706. In the case where the preset operation is performed, the preset display device 41 is turned off (step 704). Thereafter, the preset drive control is completed (step 705), and the process proceeds to step 706.

Even in the case where the zoom control switch 1 is not operated at step 701 as well, the process proceeds to step 706 to judge whether or not the focus control switch 21 is operated. In the case where the focus control switch 21 is operated, the instruction signal shifter 28 is shifted to the side of A (step 707) in order to perform the control of the focus lens unit 25 by using the focus control switch 21. Then, it is judges whether or not the preset operation is performed (step 708). In the case where the preset operation is not performed, this flowchart is completed.

In the case where the preset operation is performed, the preset operation display device 41 is turned off (step 709). Thereafter, the preset operation is completed (step 710) to complete this flow.

In the case where the focus control switch 21 is not operated at step 706, it is judged whether or not the memory position preset (MP) switch 7 has changed from the OFF state to the ON state (step 711). In the case where the MP switch 7 has not changed from the OFF state to the ON state, this flowchart is completed. On the contrary, in the case where the MP switch 7 has changed from the OFF state to the ON state, it is judged whether or not the preset operation is performed (step 712). In the case where the preset operation is performed, the instruction signal shifters 12 and 28 are shifted to the side of A (step 719) to turn off the preset operation display device 41 (step 720) thereby completing the preset operation (step 721). Thus, this flowchart is completed.

In the case where the preset operation is not performed, the instruction signal shifters 12 and 28 are shifted to the side of B (step 713) to turn on the preset operation display device 41 (step 714) to calculate the zoom speed (step 715) which conforms to the current zoom position, the preset zoom position and the set mode (the maximum speed mode, the preset speed mode, the zoom speed optimal mode, the focus speed optimal mode, the high speed optimal mode and the low speed optimal mode) by the preset speed selection switch 39 which has been described above. The zoom speed in accordance with each mode is performed in a manner as described above.

Then, next to the zoom, the current focus position, the preset focus position and the focus speed to the set mode by the preset speed selection switch 39 are calculated (step 716).

Then, the calculated zoom speed and the focus speed are set (step 717) to drive the zoom and the focus with the motors 14 and 30 from the CPU 6 via the D/A converters 10 and 26, the CPU instruction signal calculation circuits 11 and 23 and the power amplifiers 13 and 28 at the speed to start the preset drive control (step 718).

Next, in order to confirm the zoom speed and the zoom position, the zoom speed is obtained (step 722) from the A/D converter 17 to obtain the zoom position from the A/D converter 20 (step 723).

Next, it is judged whether or not the zoom position obtained at step 723 and the preset position stored in advance are equal to each other (step 724). In the case where the zoom position and the preset position are equal to each other, the instruction signal shifter 12 is converted to the side of A (step 729) to turn off the preset operation display device 41 (step 730). Thereafter, the preset operation is completed (step 731) to complete this flow.

In the case where the zoom position and the preset position are not equal to each other, it is judged whether or not the zoom speed (the detected zoom speed) obtained at step 722 and the calculated and set zoom speed (the set zoom speed) are equal to each other (step 725). In the case where both speeds are not equal to each other, it is judged whether or not the set zoom speed is faster than the detected zoom speed (step 726).

In the case where the set zoom speed is faster than the detected zoom speed, the instruction signal output to the D/A converter 10 is increased (step 728). In the case where the set zoom speed is slower than the detected speed, the instruction signal output to the D/A converter 10 is decreased (step 727). Then, the process proceeds to step 732.

In the case where the detected zoom speed and the set zoom speed are equal to each other at step 725 as well, the process proceeds to step 732.

From step 732, the process moves to the processing on the focus side. In the beginning, in order to confirm the focus speed and the focus position, the CPU 6 obtains the focus speed from the A/D converter 33 (step 732) and obtains the focus position from A/D converter 36 (step 733). Next, it is judged whether or not the focus position obtained at step 733 and the preset position stored in advance are equal to each other (step 734). In the case where the focus position and the preset position are equal to each other, the instruction signal shifter 28 is shifted to the side of A (step 739) to turn off the preset operation display device 41 (step 740) followed by completing the preset drive control (step 741). Then, this flowchart is completed.

In the case where the focus position and the preset position are not equal to each other, it is judged whether or not the focus speed (the detected focus speed) obtained at step 732 and the focus speed (the set focus speed) set in advance are equal to each other (step 735). In the case where the detected focus speed and the set focus speed are not equal to each other, it is judged whether or not the set focus speed is faster than the detected focus speed (step 736). In the case where the set focus speed is faster than the detected focus speed, the instruction signal output to the D/A converter 26 is increased (step 738). In the case where the set focus speed is slower than the detected focus speed, the instructions signal output to the D/A converter 26 is decreased (step 737). Then, the process returns to a judgment on whether the zoom control switch 1 is operated (step 701). In the case where the detected focus speed and the set focus speed are equal to each other at step 735 as well, the process returns to a judgment on whether or not the zoom control switch 1 is operated (step 701).

As has been explained above, in the case where an attempt is made to perform the preset drive control of a plurality of optical adjusting members the zoom lens unit 9, the focus lens unit 25 as well, the preset information required for each preset drive control can be stored on condition that two or more same memory instruction operation switches are turned on which are provided in one set for the prevention of erroneous operations or one memory instruction operation switch by providing a preset object selection switch.

Furthermore, respective drive speeds of the plurality of optical adjusting members which become an object of the preset drive control can be selected (one out of a plurality of modes can be selected which have different set conditions) in accordance with the image taken scenes and image-taking forms by providing a preset speed selection switch. As a consequence, in the case where the preset drive control is performed with respect to the plurality of preset control objects, difference in the drive time is eliminated to enable simultaneously completing each of the preset drive controls.

Therefore, a plurality of preset drive controls which could be realized only in the PC connection and a large-scale preset box, a simultaneous drive control which is an object of a plurality of preset control objects and a control which conforms to the drive speed of respective preset drive object are made possible which enables an attempt of decreasing the size and the weight of the lens apparatus.

Hereinafter, an embodiment as a variation of Embodiment 1 will be shown.

Embodiment 2

In Embodiment 1, there has been explained a case in which a memory position preset switch, a memory switch, a preset object selection switch, and a preset speed selection switch may be provided on the drive unit. These switches may be provided on an outside operation apparatus (demand or the like) for the remote control of the lens apparatus and the drive unit.

Embodiment 3

In Embodiment 1, the drive speed in the preset drive control of the zoom lens unit 9 and the focus lens unit 25 is set to the zoom speed optimal mode, the focus mode optimal mode, the high speed optimal mode and the low speed optimal mode with the preset speed selection switch 39 to calculate and set the other drive speed in agreement with one optical system. As a consequence, the preset drive control is simultaneously completed. In addition to these modes, a time lag is provided in the start of the preset drive control on the presupposition that zoom lens unit 9 and focus lens unit 25 driven at the preset speed. At the same time, a mode may be provided in which the preset drive control is completed.

Embodiment 4

In Embodiment 1, there has been explained a case in which a preset control object is a zoom lens unit 9 and a focus lens unit 25. An iris for adjusting exposure may be a preset control object.

In this case, (the iris control system) assumes the same structure as the control system of the focus lens unit 25 in FIG.

1. Specifically, the iris motor (not shown) is driven to adjust an aperture diameter of the iris in accordance with an instruction signal from the CPU 6. Furthermore, it is possible to connect a speed detector for detecting the speed of the iris and a position detector for detecting the position of the iris to the iris in the same manner as the zoom lens unit 9 and the focus lens unit 25.

In the Embodiment 1 which has been described above, there has been explained the preset control object as two optical adjusting members. With the preset selection switch, the zoom lens unit, the focus lens unit, and the iris can be selected. The preset control objects may be given in three. In this case, the preset drive control is performed independently with the zoom lens unit, the focus lens unit, and the iris. A package of the preset drive control may be performed with a combination of the zoom+the focus lens unit, the zoom lens unit+the iris, the focus lens unit+the iris, and the zoom lens unit+the focus lens unit+the iris.

Embodiment 5

In Embodiments 1 through 4, the drive speed of the zoom lens unit, the focus lens unit or the like is set to the maximum speed, and the drive speed (drive time) is set for substantially simultaneously completing the drive of the plurality of preset control objects. However, Embodiment 5 assumes the following structure.

Figure 16:
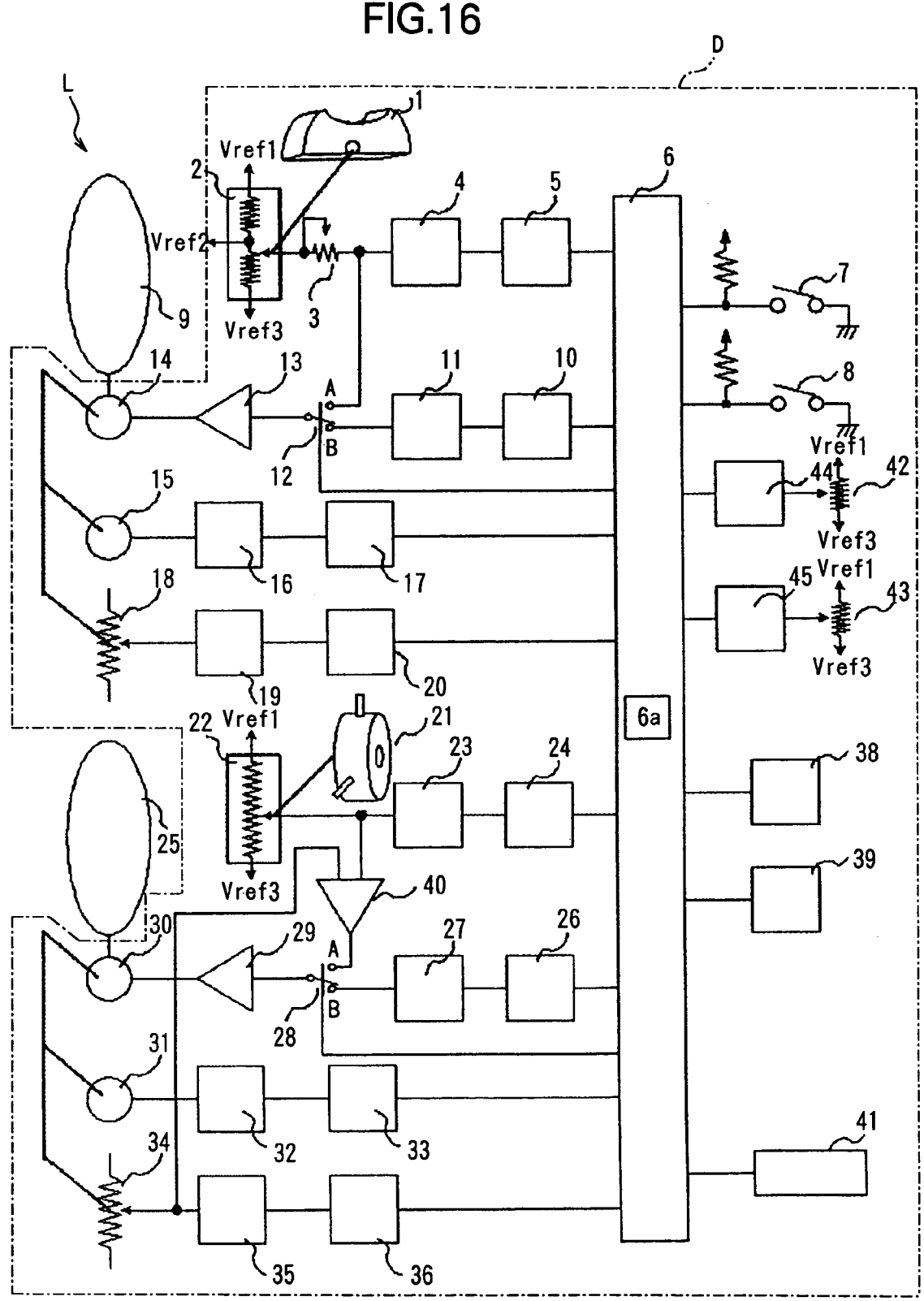
FIG. 16 is a block diagram showing a variation of Embodiment 1.
Figure 17:
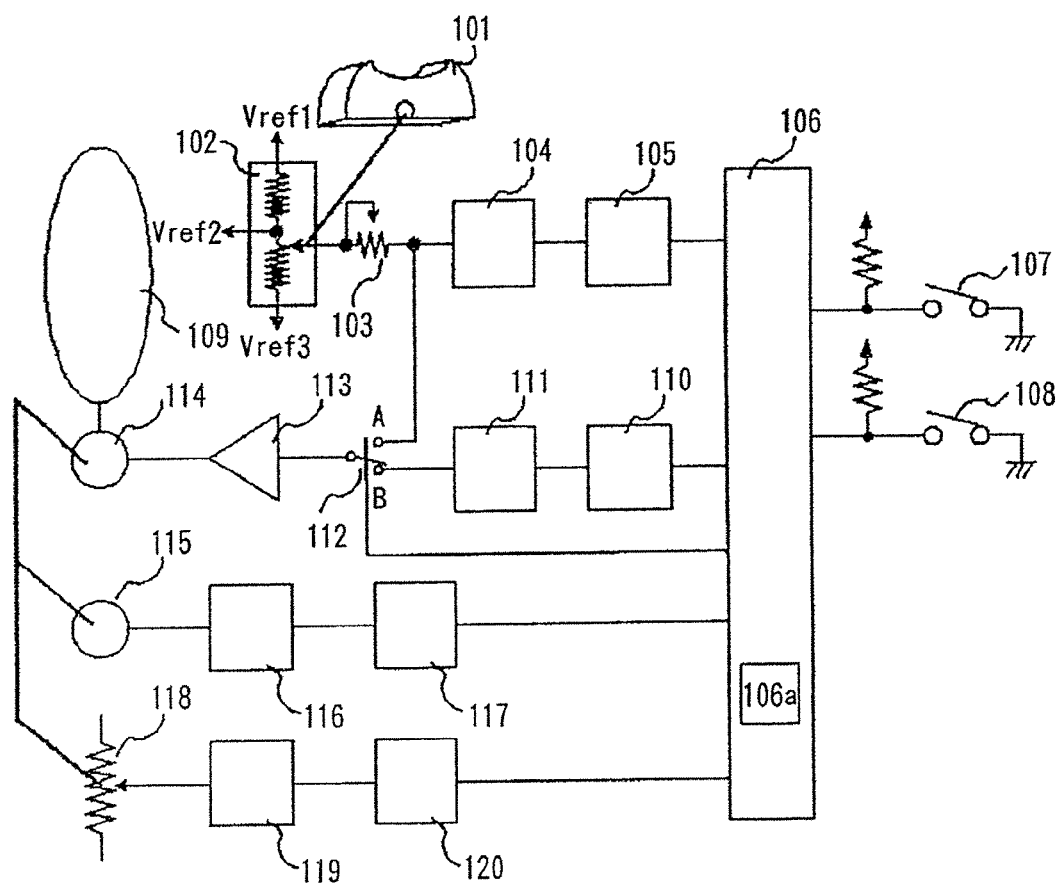
FIG. 17 is a block diagram showing a structure of the conventional lens apparatus.

A structure of Embodiment 5 is shown in FIG. 16. In Embodiment 5, a start-up characteristic setting member 43 which comprises a volume for setting the drive characteristic at the time of the start-up of the drive of the preset control object and a stop characteristic setting member 42 which comprises a volume for setting the drive characteristic at the time of the stop of the drive of the preset control object are provided to change the output characteristic of the instruction signal to the motor at the time of the start of the preset drive and at the time of the stop of the preset drive in accordance with the setting of the start-up characteristic setting member 43 and the stop characteristic setting member 42.

The other structure is the same as Embodiment 1, and the common constituent elements are denoted with the same reference numeral in Embodiment 1, which serves as the explanation thereof.

The start-up characteristic setting member 43 and the stop characteristic setting member 42 output an analog signal by adjusting the volumes respectively. The AD converters 44 and 45 convert the analog signal into a digital signal to be input to the CPU 6. Incidentally, these setting members 43 and 42 may output an analog signal in non-gradation style by means of volumes and may output a gradational analog signal or a digital numeric signal.

The CPU 6 performs the preset drive control of the preset control objects (the zoom lens unit, the focus lens unit, and the single iris, or a combination of a plurality of optical adjusting members such as zoom+focus will do) which have been selected with the preset object selection switch 38. A method for selecting a preset control object and a method for memorizing the preset position and the preset speed are the same as Embodiment 1. Furthermore, in the same manner as Embodiment 1, the CPU 6 sets the drive speed of the preset control objects in accordance with the mode selected at the preset speed selection switch 39.

At present, in the case where the preset operation is not performed, the preset drive control of the set preset control object is started toward the set drive speed at the time of the change of the memory position switch 7 from the OFF state to the ON state. At this time of the start-up, the CPU 6 detects the value set with the start-up characteristic setting member 43 to change the output characteristic of the instruction signal until the drive speed set from the motor stop state is attained with respect to the optical adjusting member which becomes a preset control object out of the zoom lens unit, the focus lens unit and the iris in accordance with the value.

Furthermore, at the time of the stop until the preset position is attained, the CPU 6 detects the value set with the stop characteristic setting member 42 with the result that the output characteristic of the instruction signal is changed until the optical adjusting member is stopped from the drive state of the set drive speed to the preset position in accordance with the value.

That is, the CPU 6 controls an instruction signal until the set drive speed is attained from the stop state at the time of the start of the preset drive control in accordance with the output characteristics of the instruction signal set with the start-up characteristic setting member 43 and the stop characteristic setting member 42. The CPU 6 controls the instruction signal until the stop state is attained from the set drive speed up to the time when the preset position is attained.

A method for changing the output characteristic of this instruction signal may be simple in which a linear expression is used. Otherwise, a quadratic expression and a polynomial expression may be used therein. As has been described above, it becomes possible to select drive characteristics such as an abrupt drive, an abrupt stop, a smooth start-up and stop by changing the output characteristics of an instruction signal at the time of start-up and stop.

Furthermore, in the Embodiment 5, there has been explained a case in which all the drive characteristics of the zoom, the focus and the iris are set by using one characteristic setting member. A switch is provided for selecting either of the zoom, the focus and the iris to set the drive characteristics at the time of the start-up and the stop of the selected optical adjusting member. Furthermore, the characteristic setting members 42 and 43 may be provided for each of the optical adjusting members.

As has been explained above, according to Embodiments of the present invention, a slow start, stop, an abrupt rise and an abrupt stop of the optical adjusting member can be controlled at the time of the start and the stop of the preset drive control, and various image-making methods demanded by the user can be adopted.

What is claimed is:

1. A drive controlling apparatus for controlling a drive of a plurality of optical adjusting members included in an optical system of an optical apparatus, comprising:

a memory configured to store preset drive information of each of the optical adjusting members which include at least one preset speed and at least one preset position;

a controller configured to control the drive of each of the optical adjusting members on the basis of the preset drive information, including a state in which the plurality of the optical adjusting members are simultaneously driven; and a selection member configured for a user to select a speed mode from a plurality of speed modes, each mode having set conditions that correspond to the preset drive information, wherein the controller sets a drive speeds for each optical adjusting member in accordance with the set conditions for the selected mode; and wherein one of the plurality of modes includes set conditions that set the drive speed of a first optical adjusting member of the plurality of optical adjusting members to a preset speed and set the drive speed of a second optical adjusting member to a speed calculated from the drive speed of the first optical adjusting member such that the drive of the first and second optical adjusting members to the preset positions stored in the memory are substantially simultaneously completed.

2. The drive controlling apparatus according to claim 1, wherein one of the plurality of modes includes set conditions that set the drive speed of each optical adjusting member to a maximum speed at which the optical adjusting member can be driven.

3. The drive controlling apparatus according to claim 1, wherein one of the plurality of speed modes includes set conditions that set the drive speed of each optical adjusting member to a preset speed stored in the memory.

4. The drive controlling apparatus according to claim 1, wherein one of the plurality of modes includes set conditions that set a first drive speed of the first optical adjusting member to a preset speed, the first drive speed being a speed at which the drive of the first optical adjusting member is most quickly completed when the first optical adjusting member is driven to the preset position, and set the drive speed of the second optical adjusting member such that the drive of the first and second optical adjusting members to the preset positions stored in the memory are substantially simultaneously completed.

5. The drive control apparatus according to claim 1, wherein one of the plurality of speed modes includes set conditions that set a first drive speed of the first optical adjusting member to a preset speed, the first drive speed being a speed at which the drive of the first optical adjusting member is most slowly completed when the first optical adjusting member is driven to the preset position, and set the drive speed of the second optical adjusting member such that the drive of the first and second optical adjusting members to the preset positions stored in the memory are substantially simultaneously completed.

6. The drive controlling apparatus according to claim 1, further comprising a characteristic setting member for variably setting a drive characteristic of the optical adjusting member, including at least one of a start time and a completion time.

7. An optical apparatus comprising:
a plurality of optical adjusting members; and
a drive controlling apparatus according to claim 1.

8. An image-taking system comprising:
an optical apparatus having a plurality of optical adjusting members; and
a drive controlling apparatus according to claim 1; and
a camera attached with the optical apparatus.

* * * * *